United States Patent
Ly et al.

(10) Patent No.: US 11,937,208 B2
(45) Date of Patent: Mar. 19, 2024

(54) REFERENCE SIGNAL MONITORING OCCASION UPDATES FOR IDLE AND INACTIVE USER EQUIPMENT

(71) Applicant: QUALCOMM Incorporated, San Diego, CA (US)

(72) Inventors: Hung Dinh Ly, San Diego, CA (US); Peter Pui Lok Ang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 228 days.

(21) Appl. No.: 17/148,768

(22) Filed: Jan. 14, 2021

(65) Prior Publication Data

US 2021/0227496 A1 Jul. 22, 2021

Related U.S. Application Data

(60) Provisional application No. 62/962,814, filed on Jan. 17, 2020.

(51) Int. Cl.
*H04W 68/02* (2009.01)
*H04L 5/00* (2006.01)

(52) U.S. Cl.
CPC .......... *H04W 68/02* (2013.01); *H04L 5/0048* (2013.01)

(58) Field of Classification Search
None
See application file for complete search history.

(56) References Cited

U.S. PATENT DOCUMENTS

| | | | |
|---|---|---|---|
| 2015/0358881 A1* | 12/2015 | Cui | H04W 24/02 455/436 |
| 2017/0078995 A1* | 3/2017 | Dinan | H04W 56/0005 |
| 2019/0253906 A1* | 8/2019 | Lin | H04L 5/0053 |
| 2019/0260484 A1 | 8/2019 | Nam et al. | |
| 2019/0305867 A1* | 10/2019 | Tseng | H04W 72/042 |
| 2019/0320455 A1* | 10/2019 | Chen | H04L 5/001 |
| 2020/0280945 A1* | 9/2020 | Tiirola | H04W 74/0808 |
| 2021/0306986 A1* | 9/2021 | Takahashi | H04L 27/26 |

(Continued)

FOREIGN PATENT DOCUMENTS

| | | |
|---|---|---|
| CN | 108809595 A | 11/2018 |
| CN | 109478967 A | 3/2019 |

(Continued)

OTHER PUBLICATIONS

International Search Report and Written Opinion—PCT/US2021/013710—ISA/EPO—dated May 12, 2021.

(Continued)

*Primary Examiner* — Adnan Baig
(74) *Attorney, Agent, or Firm* — Holland & Hart LLP

(57) ABSTRACT

Methods, systems, and devices for wireless communications are described. A user equipment (UE) may be configured with comprising a set of monitoring occasions for a reference signal. While the UE is in an inactive mode or an idle mode, a configuration for the set of monitoring occasions may be updated. The UE may be transmitted an indication of the updated set of monitoring occasions while the UE is in the inactive mode or the idle mode. The indication for the updated set of monitoring occasions may be sent via paging or system information messages.

30 Claims, 22 Drawing Sheets

(56) References Cited

U.S. PATENT DOCUMENTS

2022/0006496 A1* 1/2022 Park .................. H04W 72/23
2022/0095223 A1* 3/2022 Ohara ................ H04W 24/10
2022/0330260 A1* 10/2022 Wu .................. H04W 72/0446

FOREIGN PATENT DOCUMENTS

| CN | 109863810 A | 6/2019 | |
|---|---|---|---|
| CN | 110167109 A | 8/2019 | |
| EP | 4068670 A1 | 10/2022 | |
| WO | WO-2018031132 A1 * | 2/2018 | ........... H04L 5/0048 |

OTHER PUBLICATIONS

VIVO: "On UE Power Consumption Reduction in RRM Measurements", 3GPP Draft, 3GPP TSG RAN WG1 Meeting #94bis, R1-1810415, on UE Power Consumption Reduction in RRM Measurements, 33rd Generation Partnership Project (3GPP), Mobile Competence Centre, 650, Route Des Lucioles, F-06921 Sophia-Antipolis C, vol. RAN WG1, Sep. 29, 2018 (Sep. 29, 2018), pp. 1-7, XP051517824, Retrieved from the Internet: URL: http://www.3gpp.org/ftp/tsg%5Fran/WG1%5FRL1/TSGR1%5F94b/Docs/R1%2D1810415%2Ezip. p. 3, line 20—p. 4, line 33.

* cited by examiner

REFERENCE SIGNAL MONITORING OCCASION UPDATES FOR IDLE AND INACTIVE USER EQUIPMENT

CROSS REFERENCE

The present Application for Patent claims the benefit of U.S. Provisional Patent Application No. 62/962,814 by LY et al., entitled "REFERENCE SIGNAL MONITORING OCCASION UPDATES FOR IDLE AND INACTIVE USER EQUIPMENT," filed Jan. 17, 2020, assigned to the assignee hereof, and expressly incorporated by reference herein.

TECHNICAL FIELD

The following relates generally to wireless communications, and more specifically to reference signal monitoring occasion updates for idle and inactive user equipment (UEs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

A UE may enter a low power mode to conserve battery. While the UE is in the low power state, a configuration of a serving cell may change. Some techniques for indicating configuration updates to a UE in a low power mode may be deficient and can be improved.

SUMMARY

The described techniques relate to improved methods, systems, devices, and apparatuses that support reference signal monitoring occasion updates for idle and inactive UEs. Generally, the described techniques provide for configuring a user equipment (UE) with occasions for a reference signal while the UE is in an inactive mode or idle mode. A UE may enter the inactive mode or the idle mode to conserve battery. The UE in the inactive mode or idle mode may sleep for most of a discontinuous reception (DRX) cycle and periodically wake up to monitor for a paging message. If the UE does not detect a paging message indicating presence of data or a call, the UE may go back to sleep until the next paging occasion.

The UE may be configured to monitor reference signals, such as a tracking reference signal (TRS) and a channel state information (CSI) reference signal (CSI-RS) when the UE is in the inactive mode or the idle mode. A base station may configure the UE with occasions for reference signals, during which the base station transmits the corresponding reference signal. In some cases, a configuration for the reference signal occasions may be updated while the UE is in the inactive mode or idle mode. Techniques described herein support configuring the UE with the updated reference signal occasions while the UE is in the inactive mode or the idle mode. For example, while the UE is in the inactive mode or the idle mode, the UE may receive an indication of the potential TRS or CSI-RS occasions. In some cases, the reference signal occasions may be indicated to the UE via paging downlink control information (DCI) or paging messages. In some examples, the reference signal occasions may be indicated to the UE via system information.

A method of wireless communications at a UE is described. The method may include receiving a reference signal configuration including a set of monitoring occasions for a reference signal associated with a connected mode, where each monitoring occasion includes time and frequency resources for transmission of the reference signal, receiving paging downlink control information while operating in an idle mode or an inactive mode based on a change to the set of monitoring occasions for the reference signal, identifying an updated set of monitoring occasions for the reference signal based on receiving the paging downlink control information, and performing time and frequency tracking or a radio resource management measurement based on the reference signal received in the updated set of monitoring occasions.

An apparatus for wireless communications at a UE is described. The apparatus may include a processor, memory coupled (e.g., operatively, electronically, communicatively, or otherwise) with the processor, and instructions stored in the memory. The instructions may be executable (directly, after compiling, or after conversion, etc.,) by the processor to cause the apparatus to receive a reference signal configuration including a set of monitoring occasions for a reference signal associated with a connected mode, where each monitoring occasion includes time and frequency resources for transmission of the reference signal, receive paging downlink control information while operating in an idle mode or an inactive mode based on a change to the set of monitoring occasions for the reference signal, identify an updated set of monitoring occasions for the reference signal based on receiving the paging downlink control information, and perform time and frequency tracking or a radio resource management measurement based on the reference signal received in the updated set of monitoring occasions.

Another apparatus for wireless communications at a UE is described. The apparatus may include means for receiving a reference signal configuration including a set of monitoring occasions for a reference signal associated with a connected mode, where each monitoring occasion includes time and frequency resources for transmission of the reference signal, receiving paging downlink control information while operating in an idle mode or an inactive mode based on a change to the set of monitoring occasions for the reference signal, identifying an updated set of monitoring occasions for the reference signal based on receiving the paging downlink control information, and performing time and frequency tracking or a radio resource management measurement based on the reference signal received in the updated set of monitoring occasions.

A non-transitory computer-readable medium storing code for wireless communications at a UE is described. The code may include instructions executable (directly, after compiling, or after conversion, etc.,) by a processor to receive a reference signal configuration including a set of monitoring occasions for a reference signal associated with a connected mode, where each monitoring occasion includes time and frequency resources for transmission of the reference signal, receive paging downlink control information while operating in an idle mode or an inactive mode based on a change to the set of monitoring occasions for the reference signal, identify an updated set of monitoring occasions for the reference signal based on receiving the paging downlink control information, and perform time and frequency tracking or a radio resource management measurement based on the reference signal received in the updated set of monitoring occasions.

In some examples of the method, apparatuses, and non-transitory computer-readable medium described herein, the paging downlink control information includes an indication of the updated set of monitoring occasions for the reference signal.

In some examples of the method, apparatuses, and non-transitory computer-readable medium described herein, the paging downlink control information includes a paging identifier, a UE group identifier, or both.

In some examples of the method, apparatuses, and non-transitory computer-readable medium described herein, the paging downlink control information schedules a paging downlink shared channel.

Some examples of the method, apparatuses, and non-transitory computer-readable medium described herein may further include operations, features, means, or instructions for monitoring for a paging message including an indication of the updated set of monitoring occasions based on receiving the paging downlink control information.

In some examples of the method, apparatuses, and non-transitory computer-readable medium described herein, the paging downlink control information includes a bit indicating that the paging message includes an updated configuration for just the reference signal.

In some examples of the method, apparatuses, and non-transitory computer-readable medium described herein, the paging downlink control information includes a bit indicating that the paging message includes the indication of the updated set of monitoring occasions.

In some examples of the method, apparatuses, and non-transitory computer-readable medium described herein, the bit indicating that the paging message includes the indication of the updated set of monitoring occasions corresponds to a reserved bit.

In some examples of the method, apparatuses, and non-transitory computer-readable medium described herein, the bit indicating that the paging message includes the indication of the updated set of monitoring occasions corresponds to a repurposed bit.

In some examples of the method, apparatuses, and non-transitory computer-readable medium described herein, the paging downlink control information includes a bit indicating that the paging message includes a configuration for a tracking reference signal and not a configuration for a channel state information reference signal.

Some examples of the method, apparatuses, and non-transitory computer-readable medium described herein may further include operations, features, means, or instructions for applying a configuration associated with the updated set of monitoring occasions until a reception of a reconfiguration for the updated set of monitoring occasions.

Some examples of the method, apparatuses, and non-transitory computer-readable medium described herein may further include operations, features, means, or instructions for identifying a reference signal occasion window, where the UE assumes that the reference signal may be transmitted by a base station at reference signal occasions within the reference signal occasion window, and monitoring for the reference signal in the updated set of monitoring occasions within the reference signal occasion window.

Some examples of the method, apparatuses, and non-transitory computer-readable medium described herein may further include operations, features, means, or instructions for receiving, from a base station, a deactivation message for the updated set of monitoring occasions, and refraining from monitoring for the reference signal in the updated set of monitoring occasions after receiving the deactivation message.

Some examples of the method, apparatuses, and non-transitory computer-readable medium described herein may further include operations, features, means, or instructions for monitoring for a synchronization signal block for the time and frequency tracking and radio resource management after receiving the deactivation message.

In some examples of the method, apparatuses, and non-transitory computer-readable medium described herein, the deactivation message may be received in a reconfiguration message for the set of monitoring occasions or in downlink control information.

In some examples of the method, apparatuses, and non-transitory computer-readable medium described herein, a periodicity of the updated set of monitoring occasions may be the same as or different from a periodicity of paging occasions for the UE.

Some examples of the method, apparatuses, and non-transitory computer-readable medium described herein may further include operations, features, means, or instructions for receiving the reference signal during the updated set of monitoring occasions, measuring a signal characteristic of the reference signal, and determining a radio resource management measurement condition based on the signal characteristic.

In some examples of the method, apparatuses, and non-transitory computer-readable medium described herein, the reference signal includes a tracking reference signal, a channel state information reference signal, or both.

A method of wireless communications at a UE is described. The method may include receiving a reference signal configuration including a set of monitoring occasions for a reference signal associated with a connected mode, where each monitoring occasion includes time and frequency resources for transmission of the reference signal, receiving a system information change indication while operating in an idle mode or an inactive mode based on a change to the set of monitoring occasions for the reference signal, receiving a system information message indicating an updated set of monitoring occasions for the reference signal based on receiving the system information change indication, and performing time and frequency tracking or a radio resource management measurement based on the reference signal received in the updated set of monitoring occasions.

An apparatus for wireless communications at a UE is described. The apparatus may include a processor, memory coupled (e.g., operatively, electronically, communicatively, or otherwise) with the processor, and instructions stored in the memory. The instructions may be executable (directly, after compiling, or after conversion, etc.,) by the processor to cause the apparatus to receive a reference signal configuration including a set of monitoring occasions for a reference signal associated with a connected mode, where each monitoring occasion includes time and frequency resources for transmission of the reference signal, receive a system information change indication while operating in an idle mode or an inactive mode based on a change to the set of monitoring occasions for the reference signal, receive a system information message indicating an updated set of monitoring occasions for the reference signal based on receiving the system information change indication, and perform time and frequency tracking or a radio resource management measurement based on the reference signal received in the updated set of monitoring occasions.

Another apparatus for wireless communications at a UE is described. The apparatus may include means for receiving a reference signal configuration including a set of monitoring occasions for a reference signal associated with a connected mode, where each monitoring occasion includes time and frequency resources for transmission of the reference signal, receiving a system information change indication while operating in an idle mode or an inactive mode based on a change to the set of monitoring occasions for the reference signal, receiving a system information message indicating an updated set of monitoring occasions for the reference signal based on receiving the system information change indication, and performing time and frequency tracking or a radio resource management measurement based on the reference signal received in the updated set of monitoring occasions.

A non-transitory computer-readable medium storing code for wireless communications at a UE is described. The code may include instructions executable (directly, after compiling, or after conversion, etc.,) by a processor to receive a reference signal configuration including a set of monitoring occasions for a reference signal associated with a connected mode, where each monitoring occasion includes time and frequency resources for transmission of the reference signal, receive a system information change indication while operating in an idle mode or an inactive mode based on a change to the set of monitoring occasions for the reference signal, receive a system information message indicating an updated set of monitoring occasions for the reference signal based on receiving the system information change indication, and perform time and frequency tracking or a radio resource management measurement based on the reference signal received in the updated set of monitoring occasions.

Some examples of the method, apparatuses, and non-transitory computer-readable medium described herein may further include operations, features, means, or instructions for applying a configuration associated with the updated set of monitoring occasions until a reception of a reconfiguration for the updated set of monitoring occasions.

In some examples of the method, apparatuses, and non-transitory computer-readable medium described herein, monitoring for the reference signal further may include operations, features, means, or instructions for identifying a reference signal occasion window, where the UE assumes that the reference signal may be transmitted by a base station at reference signal occasions within the reference signal occasion window, and monitoring for the reference signal in the updated set of monitoring occasions within the reference signal occasion window.

Some examples of the method, apparatuses, and non-transitory computer-readable medium described herein may further include operations, features, means, or instructions for receiving, from a base station, a deactivation message for the updated set of monitoring occasions, and refraining from monitoring for the reference signal in the updated set of monitoring occasions after receiving the deactivation message.

Some examples of the method, apparatuses, and non-transitory computer-readable medium described herein may further include operations, features, means, or instructions for monitoring for a synchronization signal block for the time and frequency tracking and radio resource management after receiving the deactivation message.

In some examples of the method, apparatuses, and non-transitory computer-readable medium described herein, the deactivation message may be received in a reconfiguration message for the set of monitoring occasions or in downlink control information.

In some examples of the method, apparatuses, and non-transitory computer-readable medium described herein, a periodicity of the updated set of monitoring occasions may be the same as or different from a periodicity of paging occasions for the UE.

Some examples of the method, apparatuses, and non-transitory computer-readable medium described herein may further include operations, features, means, or instructions for receiving the reference signal during the updated set of monitoring occasions, measuring a signal characteristic of the reference signal, and determining a radio resource management measurement condition based on the signal characteristic.

In some examples of the method, apparatuses, and non-transitory computer-readable medium described herein, the reference signal includes a tracking reference signal, a channel state information reference signal, or both.

A method of wireless communications at a base station is described. The method may include transmitting, to a UE, a reference signal configuration including a set of transmission occasions for a reference signal associated with a connected mode, where each transmission occasion includes time and frequency resources for transmitting the reference signal, determining an updated set of transmission occasions for the reference signal based on a change to the set of transmission occasions, transmitting paging downlink control information while the UE is operating in an inactive mode or an idle mode based on the change, and transmitting the reference signal in the updated set of transmission occasions while the UE is operating in the connected mode.

An apparatus for wireless communications at a base station is described. The apparatus may include a processor, memory coupled (e.g., operatively, electronically, communicatively, or otherwise) with the processor, and instructions stored in the memory. The instructions may be executable (directly, after compiling, or after conversion, etc.,) by the processor to cause the apparatus to transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit paging downlink control information while the UE is operating in an inactive mode or an idle mode based on the change, and transmit the reference signal in the updated set of transmission occasions while the UE is operating in the connected mode.

Another apparatus for wireless communications at a base station is described. The apparatus may include means for transmitting, to a UE, a reference signal configuration including a set of transmission occasions for a reference signal associated with a connected mode, where each transmission occasion includes time and frequency resources for transmitting the reference signal, determining an updated set of transmission occasions for the reference signal based on a change to the set of transmission occasions, transmitting paging downlink control information while the UE is operating in an inactive mode or an idle mode based on the change, and transmitting the reference signal in the updated set of transmission occasions while the UE is operating in the connected mode.

A non-transitory computer-readable medium storing code for wireless communications at a base station is described. The code may include instructions executable (directly, after compiling, or after conversion, etc.,) by a processor to transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit paging downlink control information while the UE is operating in an inactive mode or an idle mode based on the change, and transmit the reference signal in the updated set of transmission occasions while the UE is operating in the connected mode.

In some examples of the method, apparatuses, and non-transitory computer-readable medium described herein, the paging downlink control information includes an indication of the updated set of transmission occasions for the reference signal.

In some examples of the method, apparatuses, and non-transitory computer-readable medium described herein, the paging downlink control information includes a paging identifier, a UE group identifier, or both.

In some examples of the method, apparatuses, and non-transitory computer-readable medium described herein, the paging downlink control information schedules a paging downlink shared channel.

Some examples of the method, apparatuses, and non-transitory computer-readable medium described herein may further include operations, features, means, or instructions for transmitting a paging message including an indication of the updated set of transmission occasions based on transmitting the paging downlink control information.

In some examples of the method, apparatuses, and non-transitory computer-readable medium described herein, the paging downlink control information includes a bit indicating that a configuration includes an updated configuration for just the reference signal.

In some examples of the method, apparatuses, and non-transitory computer-readable medium described herein, the paging downlink control information includes a bit indicating that the paging message includes the indication of the updated set of transmission occasions.

In some examples of the method, apparatuses, and non-transitory computer-readable medium described herein, the bit indicating that the paging message includes the indication of the updated set of transmission occasions corresponds to a reserved bit.

In some examples of the method, apparatuses, and non-transitory computer-readable medium described herein, the bit indicating that the paging message includes the indication of the updated set of transmission occasions corresponds to a repurposed bit.

In some examples of the method, apparatuses, and non-transitory computer-readable medium described herein, the paging downlink control information includes a bit indicating that the paging message includes a configuration for a tracking reference signal and not a configuration for a channel state information reference signal.

Some examples of the method, apparatuses, and non-transitory computer-readable medium described herein may further include operations, features, means, or instructions for transmitting a deactivation message to the UE for the updated set of transmission occasions.

In some examples of the method, apparatuses, and non-transitory computer-readable medium described herein, the deactivation message may be transmitted in a reconfiguration message for the set of transmission occasions or in downlink control information.

In some examples of the method, apparatuses, and non-transitory computer-readable medium described herein, a periodicity of the updated set of transmission occasions corresponds to a periodicity of paging occasions for the UE.

In some examples of the method, apparatuses, and non-transitory computer-readable medium described herein, the reference signal includes a tracking reference signal, a channel state information reference signal, or both.

A method of wireless communications at a base station is described. The method may include transmitting, to a UE, a reference signal configuration including a set of transmission occasions for a reference signal associated with a connected mode, where each transmission occasion includes time and frequency resources for transmitting the reference signal, determining an updated set of transmission occasions for the reference signal based on a change to the set of transmission occasions, transmitting a system information change indication to the UE while the UE is operating in an inactive mode or an idle mode based on the change, transmitting a system information message indicating the updated set of transmission occasions for the reference signal, and transmitting the reference signal in the updated set of transmission occasions while the UE is operating in the connected mode.

An apparatus for wireless communications at a base station is described. The apparatus may include a processor, memory coupled (e.g., operatively, electronically, communicatively, or otherwise) with the processor, and instructions stored in the memory. The instructions may be executable (directly, after compiling, or after conversion, etc.,) by the processor to cause the apparatus to transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit a system information change indication to the UE while the UE is operating in an inactive mode or an idle mode based on the change, transmit a system information message indicating the updated set of transmission occasions for the reference signal, and transmit the reference signal in the updated set of transmission occasions while the UE is operating in the connected mode.

Another apparatus for wireless communications at a base station is described. The apparatus may include means for transmitting, to a UE, a reference signal configuration including a set of transmission occasions for a reference signal associated with a connected mode, where each transmission occasion includes time and frequency resources for transmitting the reference signal, determining an updated set of transmission occasions for the reference signal based on a change to the set of transmission occasions, transmitting a system information change indication to the UE while the UE is operating in an inactive mode or an idle mode based on the change, transmitting a system information message indicating the updated set of transmission occasions for the reference signal, and transmitting the reference signal in the updated set of transmission occasions while the UE is operating in the connected mode.

A non-transitory computer-readable medium storing code for wireless communications at a base station is described. The code may include instructions executable (directly, after compiling, or after conversion, etc.,) by a processor to transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit a system information change indication to the UE while the UE is operating in an inactive mode or an idle mode based on the change, transmit a system information message indicating the updated set of transmission occasions for the reference signal, and transmit the reference signal in the updated set of transmission occasions while the UE is operating in the connected mode.

Some examples of the method, apparatuses, and non-transitory computer-readable medium described herein may further include operations, features, means, or instructions for transmitting a reconfiguration for the updated set of transmission occasions, where the reference signal may be transmitted based on the reconfiguration after transmitting the reconfiguration.

Some examples of the method, apparatuses, and non-transitory computer-readable medium described herein may further include operations, features, means, or instructions for transmitting a deactivation message for the updated set of transmission occasions to the UE.

In some examples of the method, apparatuses, and non-transitory computer-readable medium described herein, the deactivation message may be transmitted in a reconfiguration message for the set of transmission occasions or in downlink control information.

In some examples of the method, apparatuses, and non-transitory computer-readable medium described herein, a periodicity of the updated set of transmission occasions may be the same as or different from a periodicity of paging occasions for the UE.

In some examples of the method, apparatuses, and non-transitory computer-readable medium described herein, the reference signal includes a tracking reference signal, a channel state information reference signal, or both.

DETAILED DESCRIPTION

Figure 1:
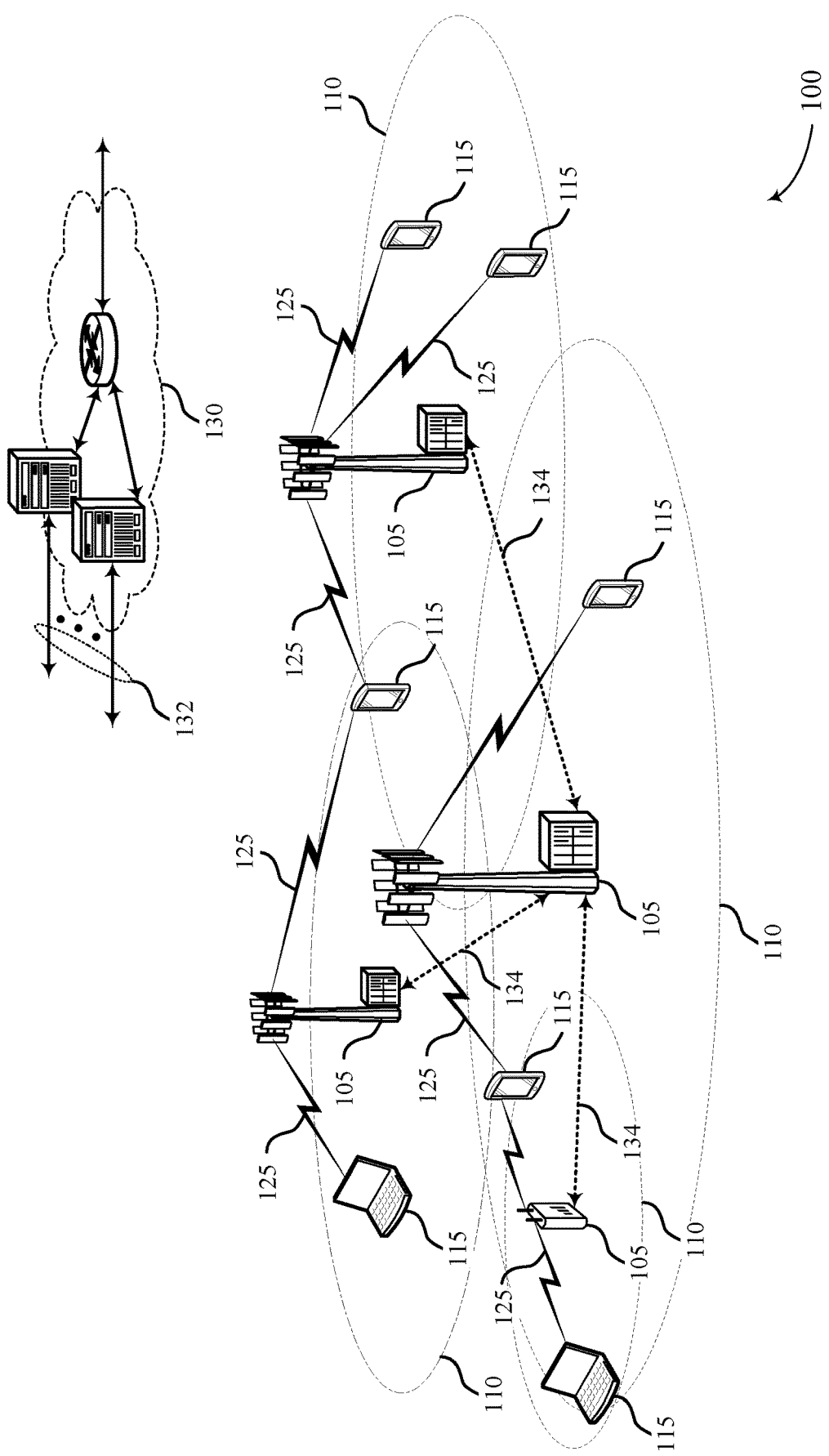
FIG. 1 illustrates an example of a system for wireless communications that supports reference signal monitoring occasion updates for idle and inactive UEs in accordance with aspects of the present disclosure.

A user equipment (UE) in a wireless communications system may enter a low power mode to conserve battery and improve power savings. For example, some wireless communications systems may support an inactive mode and an idle mode for UEs. A UE operating in the inactive mode or the idle mode may spend less time monitoring for signaling from a base station, thereby reducing power consumption. The UE in the inactive mode or idle mode may sleep for most of a discontinuous reception (DRX) cycle and periodically wake up to monitor for a paging message. If the UE does not detect a paging message indicating presence of data or a call, the UE may go back to sleep until the next paging occasion.

When the UE is operating in an active or connected mode, a base station may manage radio resource management for the UE based on UE mobility, radio channel quality, or both. For example, a base station may track the location and positioning of the UE to provide the UE with a strong connection and beam to communicate with nearby cells. In some cases, a base station may transmit a tracking reference signal (TRS) to the UE, which may be used to track the location of the UE within the wireless communications system. To measure channel conditions for the UE, the base station may transmit a channel state information reference signal (CSI-RS). The UE may measure the CSI-RS and provide a CSI report to the base station indicating various radio channel quality measurements.

The base station may configure the UE with occasions for reference signals such as TRS and CSI-RS. The occasions may include time and frequency resources where the base station transmits the reference signal. The occasions may have a configured periodicity and pattern in the time and frequency domain. In some cases, a configuration for the reference signal occasions may be updated while the UE is in the inactive mode or idle mode. Some systems may provide the UE with the updated configuration once the UE enters the connected mode. However, signaling the updated configuration once the UE is in the connected mode may have a large system overhead.

To reduce signaling overhead, the wireless communications system may support configuring the UE with reference signal occasions while the UE is in the inactive mode or the idle mode. For example, while the UE is in the inactive mode or the idle mode, the UE may receive potential TRS or CSI-RS occasions available when the UE is in the connected mode. In some cases, the reference signal occasions may be indicated to the UE via paging downlink control information (DCI) or paging messages. For example, the paging DCI may include the TRS/CSI-RS occasion configuration. In some cases, the paging DCI may indicate that the TRS/CSI-RS occasion configuration is included in the paging message. In some examples, the reference signal occasions may be indicated to the UE via system information. The base station may transmit a system information change indication, and the UE may monitor for system information based on receiving the indication. Additional techniques, such as configuring how long the UE is to use the updated configuration, are described.

Aspects of the disclosure are initially described in the context of a wireless communications system. Aspects of the disclosure are further illustrated by and described with reference to apparatus diagrams, system diagrams, and flowcharts that relate to reference signal monitoring occasion updates for idle and inactive UEs.

FIG. 1 illustrates an example of a wireless communications system 100 that supports reference signal monitoring occasion updates for idle and inactive UEs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a multimedia/entertainment device (e.g., a radio, a MP3 player, a video device, etc.), a camera, a gaming device, a navigation/positioning device (e.g., GNSS (global navigation satellite system) devices based on, for example, GPS (global positioning system), Beidou, GLONASS, or Galileo, a terrestrial-based device, etc.), a tablet computer, a laptop computer, or a personal computer, a netbook, a smartbook, a personal computer, a smart device, a wearable device (e.g., a smart watch, smart clothing, smart glasses, virtual reality goggles, a smart wristband, smart jewelry (e.g., a smart ring, a smart bracelet)), a drone, a robot/robotic device, a vehicle, a vehicular device, a meter (e.g., parking meter, electric meter, gas meter, water meter), a monitor, a gas pump, an appliance (e.g., kitchen appliance, washing machine, dryer), a location tag, a medical/healthcare device, an implant, a sensor/actuator, a display, or any other suitable device configured to communicate via a wireless or wired medium. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. In an aspect, techniques disclosed herein may be applicable to MTC or IoT UEs. MTC or IoT UEs may include MTC/enhanced MTC (eMTC, also referred to as CAT-M, Cat M1) UEs, NB-IoT (also referred to as CAT NB1) UEs, as well as other types of UEs. eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $Tf=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

When a UE 115 does not have much traffic from serving cells, the UE 115 may enter a low power mode to conserve battery and improve power savings. For example, the UE 115 may enter an inactive mode or an idle mode. When the UE 115 is in the inactive mode, the last-serving base station 105 may maintain access-stratum context for the UE 115, which may have been established by an RRC connection. When the UE 115 is in the idle mode, the network may discard the UE context.

When the UE 115 is operating in the inactive mode or the idle mode, the UE 115 may spend less time monitoring for signaling, thereby reducing power consumption. While operating in the inactive mode or idle mode, the UE 115 may sleep for most of a DRX cycle and periodically wake up to monitor for a paging message. In some cases, the UE 115 may monitor for one paging occasion per DRX cycle. Each paging occasion may include a set of physical downlink control channel (PDCCH) monitoring occasions and may include multiple time slots (e.g., multiple subframes or multiple OFDM symbols) where paging DCI may be sent. The UE 115 may attempt to decode signals using a paging radio network temporary identifier (P-RNTI) to check for messages indicating pending data. If the UE 115 does not detect a paging message indicating presence of data or a call, the UE 115 may go back to sleep until the next paging occasion.

Some UEs 115, such as earthquake and tsunami warning system (ETWS) capable UEs 115 and commercial mobile alert system (CMAS) capable UEs 115, may also monitor for public warnings (e.g., via a public warning system). These UEs 115 may monitor for indications about public warning systems notifications in the paging occasion of each DRX cycle.

While in the inactive mode or idle mode, the UE 115 may also monitor for system information change indications. System information change indications may be transmitted in paging occasions to indicate that a configuration or system information has been updated. In some cases, a modification period may be used to broadcast updated system information (e.g., other than for ETWS and CMAS). The updated system information may be transmitted in the modification period after the system information change indication is transmitted. The modification period boundaries may be based on system frame number (SFN) values for which SFN mod m=0, where m is the number of radio frames including the modification period. The modification period may be configured by system information. The UE 115 may receive indications about SI modifications or public warning system (PWS) notifications using messages transmitted with P-RNTI over DCI. A system information change indication may be repeated transmitted within a modification period.

When a UE 115 is operating in an active or connected mode, a serving base station 105 may manage some radio resource management operations for the UE 115 based on UE mobility, radio channel quality, or both. For example, the base station 105 may track the location and positioning of the UE 115 to provide a strong connection and beam. If, for example, the base station 105 determines that the UE 115 has moved closer to another base station 105, the base station 105 may initiate a handover procedure to the other base station 105. Additionally, if the UE 115 moves within the cell coverage area provided by the base station 105 such that another beam provides a stronger connection, the base station 105 may switch to the stronger beam.

The techniques described herein support configuring a UE 115 in an inactive mode or an idle mode with occasions for reference signals such as TRS and CSI-RS. For example, while the UE 115 is in the inactive mode or the idle mode, the UE 115 may receive an indication of potential TRS or CSI-RS occasions which are available when the UE 115 is in the connected mode. In some cases, the reference signal occasions may be indicated to the UE 115 via paging DCI or paging messages. For example, the paging DCI may include the TRS/CSI-RS occasion configuration. In some cases, the paging DCI may indicate that the TRS/CSI-RS occasion configuration is included in the paging message. In some examples, the reference signal occasions may be indicated to the UE 115 via system information. The base station 105 may transmit a system information change indication, and the UE may monitor for system information based on receiving the indication. Additional techniques, such as configuring how long the UE is to use the updated configuration, are described.

Figure 2:
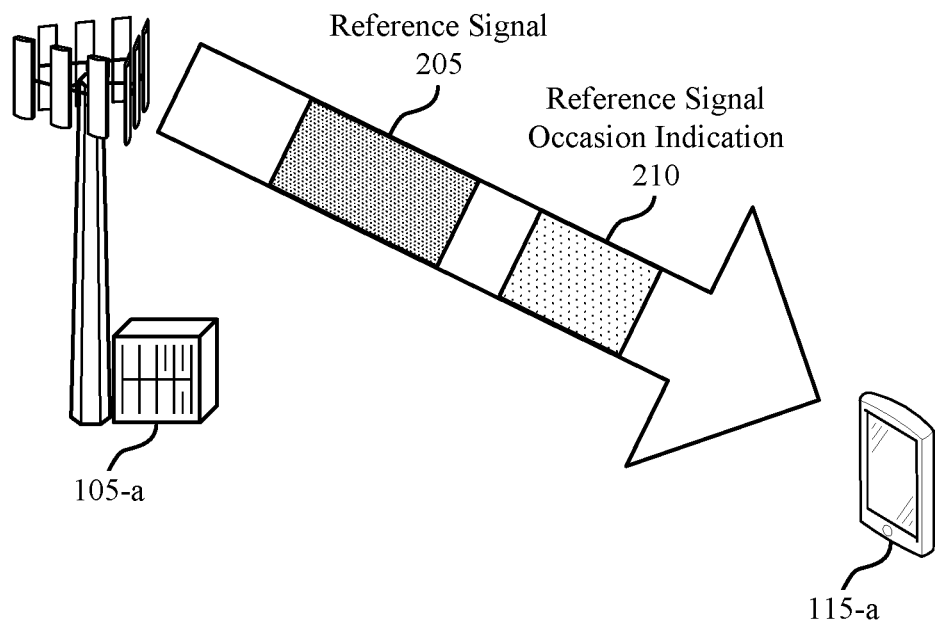
FIG. 2 illustrates an example of a wireless communications system that supports reference signal monitoring occasion updates for idle and inactive UEs in accordance with aspects of the present disclosure.

FIG. 2 illustrates an example of a wireless communications system 200 that supports reference signal monitoring occasion updates for idle and inactive UEs in accordance with aspects of the present disclosure. In some examples, the wireless communications system 200 may implement aspects of wireless communication system 100. The wireless communications system 200 may include UE 115-a and base station 105-a, which may be respective examples of a UE 115 and a base station 105 described with reference to FIG. 1.

When UE 115-a does not have traffic from serving cells, UE 115-a may enter a low power mode to conserve battery and improve power savings. For example, UE 115-a may enter an inactive mode or an idle mode. When UE 115-a is in the inactive mode, base station 105-a may maintain the UE context established by an RRC connection. When UE 115-a is in the idle mode, base station 105-a may discard the UE context.

When UE 115-a is operating in the inactive mode or the idle mode, UE 115-a may spend less time monitoring for signaling from base stations 105, thereby reducing power consumption. While operating in the inactive mode or idle mode, UE 115-a may sleep for most of a DRX cycle and periodically wake up to monitor for a paging message. In some cases, UE 115-a may monitor for one paging occasion per DRX cycle. If UE 115-a does not detect a paging message indicating presence of data or a call, UE 115-a may go back to sleep until the next paging occasion. While in the inactive mode or idle mode, UE 115-a may also monitor for system information change indications. System information change indications may be transmitted in paging occasions to indicate that a configuration or system information has been updated.

When UE 115-a is operating in an active or connected mode, a serving base station 105, such as base station 105-a, may manage some radio resource management operations for UE 115-a based on UE mobility, radio channel quality, or both. In some cases, base station 105-a may transmit a TRS to UE 115-a, which may be used to track the location of UE 115-a within the wireless communications system 200. To measure channel conditions for UE 115-a, base station 105-a may transmit a CSI-RS. UE 115-a may measure the CSI-RS and provide a CSI report to the base station indicating various radio channel quality measurements.

Base station 105-a may configure UE 115-a with occasions for a reference signal 205, which may include a TRS, CSI-RS, or both. The occasions may include time and frequency resources where base station 105-a is scheduled to transmit the reference signal 205. The occasions may have a configured periodicity and pattern in the time and frequency domain. In some cases, a reference signal occasion may refer to a monitoring occasion or a transmission occasion. In some examples, a monitoring occasion may refer to the reference signal occasion for a receiver, during which the receiver may monitor for the reference signal. In some examples, a transmission occasion may refer to the reference signal occasion for a transmitter, during which the transmitter may transmit the reference signal. In some cases, the terms transmission occasion, monitoring occasion, occasion, and reference signal occasion may be used interchangeably. For example, a first monitoring occasion and a first transmission occasion may refer to the same time and frequency resources.

In some cases, a configuration for the reference signal occasions may be updated while UE 115-a is in the inactive mode or idle mode. For example, UE 115-a may be configured with an initial set of TRS and CSI-RS occasions, but base station 105-a, or the core network, may change a resource allocation for TRS and CSI-RS while UE 115-a is in the inactive mode or idle mode. Therefore, UE 115-a may not have the correct configuration and may not be able to receive TRS or CSI-RS until receiving the updated configuration. Some systems may provide a UE 115 with an updated configuration once the UE 115 enters the connected mode. However, signaling the updated configuration once the UE 115 is in the connected mode may have a large system overhead.

To reduce signaling overhead, the wireless communications system 200 may support configuring a UE 115, such as UE 115-a, with reference signal occasions while the UE 115 is in the inactive mode or the idle mode. For example, while UE 115-a is in the inactive mode or the idle mode, UE 115-a may receive a reference signal occasion indication, which may indicate potential TRS or CSI-RS occasions available to UE 115-a when in the connected mode. By indicating the reference signal occasions while UE 115-a is in the idle mode or inactive mode, the system overhead may be reduced.

In some cases, the reference signal occasions may be indicated to the UE via paging DCI or paging messages. For example, the paging DCI may include the TRS/CSI-RS occasion configuration. In some cases, the paging DCI may indicate that the TRS/CSI-RS occasion configuration is included in the paging message. The paging DCI may be carried by a physical downlink control channel (PDCCH), and the paging messages may be carried by a physical downlink shared channel (PDSCH).

If the reference signal occasion indication 210 is sent via paging DCI, the paging CI may include the TRS and CSI-RS occasion configuration, an identifier for a paging group or UE group, or a combination thereof. In some cases, the paging DCI carrying the reference signal occasion indication 210 may have a format specifically configured to convey the reference signal occasion indication 210. For example, the paging DCI may be an example of a new paging DCI with a new paging DCI format. In some examples, the new paging DCI may have a different resource allocation than, for example Format 1_0, Format 1_1, Format 2_0 or Format 2_1 DCI. In some cases, the reference signal occasion indication 210 may be included in paging DCI for unicast paging. In some cases, the reference signal occasion indication 210 may be included in, or appended to, a legacy paging DCI.

In some cases, UE 115-*a* may receive the reference signal occasion indication 210 via a paging signal. The paging signal may be, for example, a paging DCI or a paging message. Additionally, or alternatively, a paging signal may include a system information change indication. For example, UE 115-*a* may receive a paging signal (e.g., a paging DCI or paging message) including an indication that system information has been updated, and UE 115-*a* may monitor for updated system information based on receiving the paging signal. UE 115-*a* may identify an updated set of monitoring occasions for the reference signal based on receiving the updated system information.

In some cases, the reference signal occasion indication 210 may be appended to a paging message. In some cases, one bit in the paging DCI may indicate whether the TRS configuration is updated. In some case, one bit in the paging DCI may indicate whether the TRS configuration is provided or not. In some cases, one bit in the paging DCI may indicate whether just the TRS configuration is provided. Therefore, a UE 115 which does not support TRS may ignore the paging message if, for example, the paging message is just used to provide the TRS configuration or to provide an update for a TRS configuration. In some cases, a bit may be repurposed from a previous paging DCI format for the signaling. In some examples, a reserved bit of an existing paging DCI format may be used for the signaling. In some cases, the reference signal occasion indication 210 may be included in a paging message for broadcast paging schemes.

In some examples, the reference signal occasions may be indicated to UE 115-*a* via system information. Base station 105-*a* may transmit a system information change indication, and UE 115-*a* may monitor for system information based on receiving the indication. UE 115-*a* may monitor for an SI change indication in its own paging occasion during each DRX cycle. UE 115-*a* may then receive an indication that the system information has changed then monitor for system information based on the change indication. The system information may include the reference signal occasion indication 210.

UE 115-*a* may be configured to use the reference signal occasions indicated by the reference signal occasion indication 210 for a certain duration. For example, UE 115-*a* may use the updated configuration until a new configuration of potential TRS/CSI-RS occasions is provided. For example, base station 105-*a* may have another update for the occasions and transmit another reference signal occasion indication. The latest received occasion indication may be used by UE 115-*a*.

In some examples, the reference signal occasion indication 210 may include a duration over which UE 115-*a* can assume the TRS and CSI-RS occasions. For example, the reference signal occasion indication 210 may indicate to UE 115-*a* that the indicated occasions can be assumed for the next N frames, DRX cycles, or paging occasions. After the indicated duration, UE 115-*a* may either assume a default reference signal occasion configuration. In some cases, UE 115-*a* may assume there are not resources configured for TRS or CSI-RS after the duration.

In some cases, base station 105-*a* may transmit a deactivation message to UE 115-*a*. In some cases, upon reception of the deactivation message, UE 115-*a* may revert to a previous operation. For example, UE 115-*a* may assume a default set of reference signal occasions. In some cases, UE 115-*a* may use synchronization signal/physical broadcast channel (SS/PBCH) blocks for time and frequency tracking and radio resource management. In some cases, the configuration deactivation/activation signaling may be indicated as part of the TRS and CSI-RS configuration or in paging DCI.

In some examples, the TRS, CSI-RS, or both, may be used for radio resource management measurement relaxation. For example, UE 115-*a* may measure the reference signal 205 and determine a signal characteristic of the reference signal. For example, UE 115-*a* may determine a reference signal received power, a reference signal received quality, or a reference signal strength indicator based on a CSI-RS or a TRS. UE 115-*a* may use the signal characteristic in determining the conditions for radio resource management (RRM) measurement relaxation. In some cases, the periodicity of the reference signal occasions may be the same as the periodicity of the paging occasions. In some cases, the periodicity of the reference signal occasions may be different from the periodicity of the paging occasions.

Figure 3:
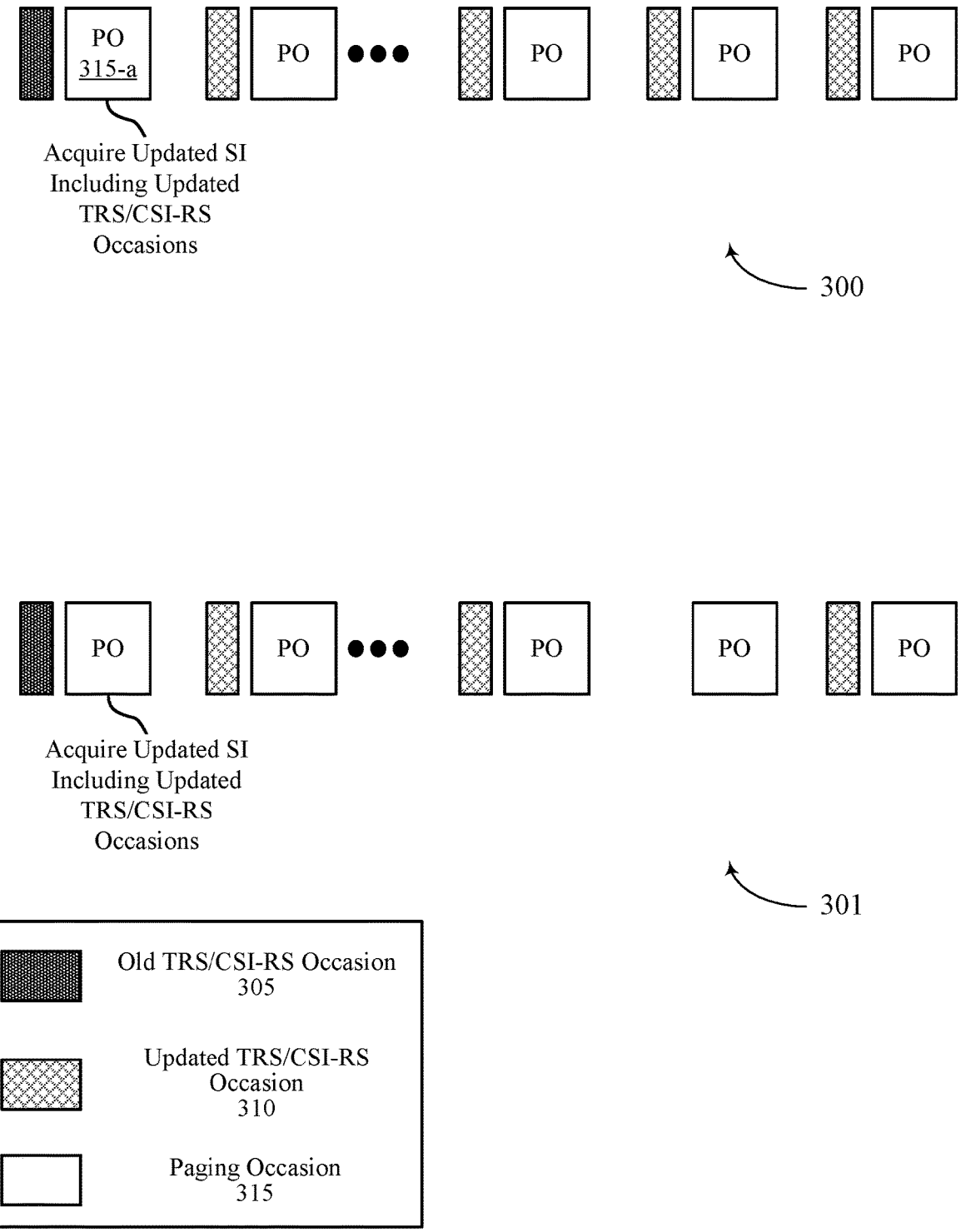
FIG. 3 illustrates examples of reference signal occasion update schemes that support reference signal monitoring occasion updates for idle and inactive UEs in accordance with aspects of the present disclosure.

FIG. 3 illustrates examples of reference signal occasion update schemes 300 and 301 that support reference signal monitoring occasion updates for idle and inactive UEs in accordance with aspects of the present disclosure. In some examples, the reference signal occasion update schemes 300 and 301 may implement aspects of wireless communication system 100.

A UE 115 may be configured with updated occasions for TRS, CSI-RS, or both, while the UE 115 is operating in an inactive mode or an idle mode. The UE 115 may receive a configuration for old TRS/CSI-RS occasions 305 from a base station 105. For example, when the UE 115 establishes a connection with a base station 105, the UE 115 may receive a default configuration for TRS/CSI-RS occasions. The UE 115 may enter the inactive mode or the idle mode, and the base station 105 may update a TRS/CSI-RS configuration. For example, the TRS/CSI-RS configuration may be changed to include updated TRS/CSI-RS occasions 310. The UE 115 may receive an indication of the updated TRS/CSI-RS occasions 310 while operating in the inactive mode or the idle mode.

In some cases, the TRS/CSI-RS occasion update may be sent by paging. For example, The UE 115-*a* may receive paging DCI indicating that the TRS/CSI-RS occasions have been updated. In some cases, the paging DCI may include the TRS/CSI-RS occasion configuration. For example, the UE 115 may receive paging DCI in paging occasion 315-*a*, and the paging DCI may include the indication of the updated TRS/CSI-RS occasions 310. The paging DCI may include a group identifier or a UE identifier. In some cases, a UE 115 may decode the paging DCI and obtain the indication of the updated TRS/CSI-RS occasions 310 if the UE 115 has a matching group identifier or UE identifier. In some cases, a base station 105 may indicate the updated TRS/CSI-RS occasions 310 via paging DCI if a UE 115 is configured for unicast paging.

In some cases, the TRS/CSI-RS occasion may be appended to a paging message. For example, the paging DCI may indicate whether the TRS configuration is updated, whether the TRS configuration is provided, whether just the TRS configuration is provided in the paging message, or any combination thereof. In some cases, a bit of a legacy paging DCI may be repurposed for this signaling. In some cases, a reserved bit of paging DCI may be used for this signaling. In some cases, one bit may be used to indicate each of whether the TRS configuration is updated, whether the TRS configuration is provided, or whether just the TRS configuration is provided. In some cases, just one bit may be used to indicate whether the TRS configuration is updated, whether the TRS configuration is provided, or whether just the TRS configuration is provided. In some cases, the paging DCI conveying the TRS/CSI-RS occasion may be a new type of paging DCI. In some cases, the TRS/CSI-RS occasion configuration may be appended to a legacy paging DCI.

The UE 115 may receive the paging DCI in paging occasion 315-a and monitor for the paging message carrying the TRS/CSI-RS occasion configuration. In some cases, a UE 115 which is not configured for TRS may refrain from monitoring for the paging message if the paging DCI indicates that the paging message includes just the TRS configuration.

In some cases, the TRS/CSI-RS occasion configuration may be sent via system information. For example, the UE 115 in the idle mode or inactive mode may monitor for a system information change indication in each paging occasion 315. The UE 115 may receive a paging message and check for a system information change indication in the paging message. If the UE 115 does receive the system information change indication, the UE 115 may determine that a change has been made to the system information. The UE 115 may then monitor for system information including the TRS/CSI-RS occasion configuration. A system information change indication may be included in a paging message or paging DCI.

The periodicity of the updated TRS/CSI-RS occasions 310 may be configurable. For example, for the reference signal occasion update scheme 300, the updated TRS/CSI-RS occasions 310 have the same periodicity as the paging occasions 315 or the same periodicity as the paging cycle. For the reference signal occasion update scheme, the updated TRS/CSI-RS occasions 310 may have a different periodicity as the paging occasions 315. The periodicity of the updated TRS/CSI-RS occasions 310 may be configurable regardless of whether the TRS/CSI-RS occasion configuration was sent via paging or system information.

Figure 4:
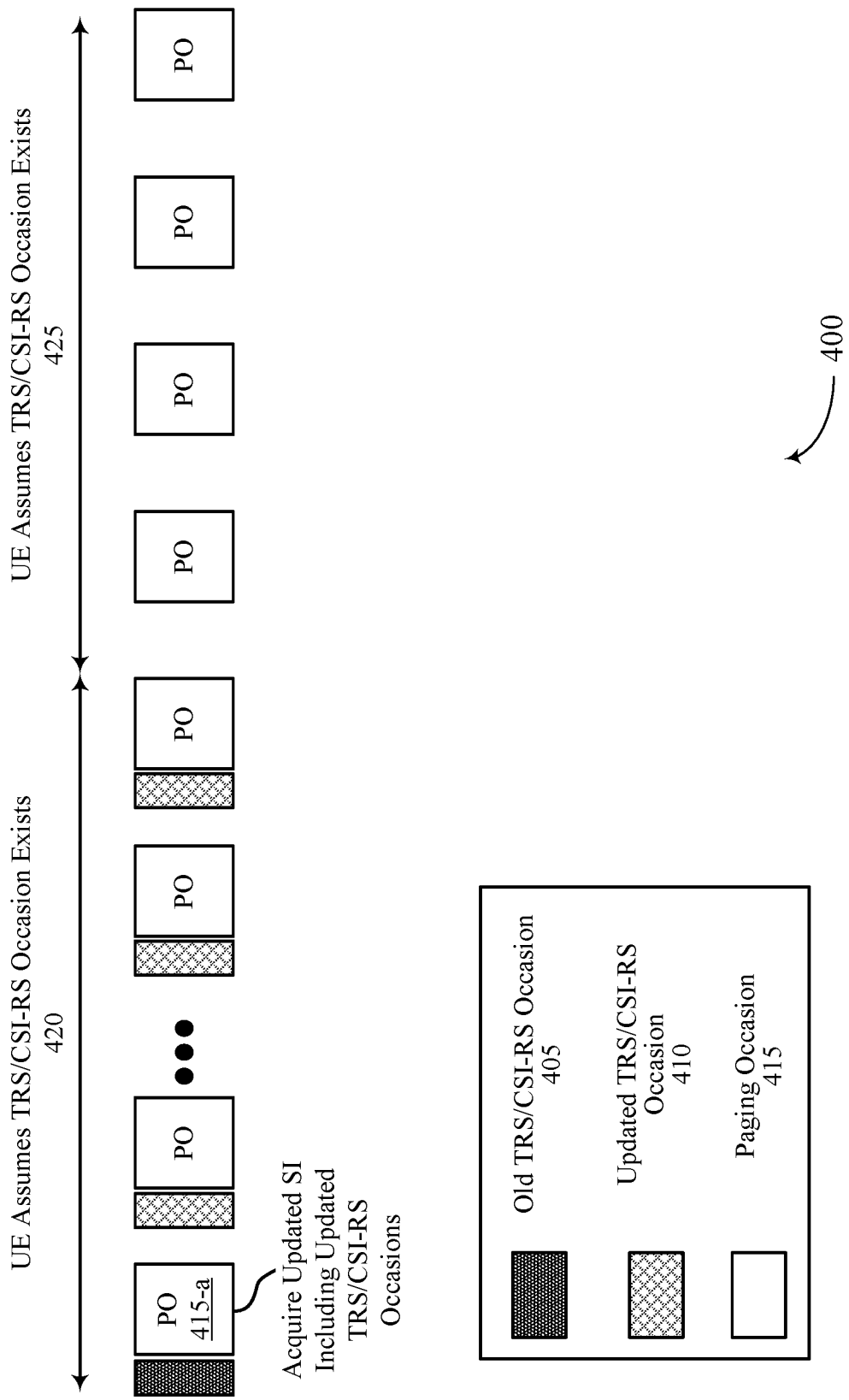
FIG. 4 illustrates an example of a reference signal occasion update scheme that supports reference signal monitoring occasion updates for idle and inactive UEs in accordance with aspects of the present disclosure.

FIG. 4 illustrates an example of a reference signal occasion update scheme 400 that supports reference signal monitoring occasion updates for idle and inactive UEs in accordance with aspects of the present disclosure. In some examples, the reference signal occasion update scheme 400 may implement aspects of wireless communication system 100.

A UE 115 may be configured with updated occasions for TRS, CSI-RS, or both, while the UE 115 is operating in an inactive mode or an idle mode. The UE 115 may receive a configuration for old TRS/CSI-RS occasions 405 from a base station 105. For example, when the UE 115 establishes a connection with a base station 105, the UE 115 may receive a default configuration for TRS/CSI-RS occasions. The UE 115 may enter the inactive mode or the idle mode, and the base station 105 may update a TRS/CSI-RS configuration. For example, the TRS/CSI-RS configuration may be changed to include updated TRS/CSI-RS occasions 410. The UE 115 may receive an indication of the updated TRS/CSI-RS occasions 410 while operating in the inactive mode or the idle mode. In some cases, the UE 115 may receive the indication during a paging occasion 415, such as paging occasion 415-a.

In some cases, the UE 115 may use the updated TRS/CSI-RS occasions 310 for a configured duration of time. For example, the UE 115 may use the updated TRS/CSI-RS occasions 410 until a new configuration of potential TRS/CSI-RS occasions is provided. If the base station 105 reconfigures resources for TRS, CSI-RS, or both, the base station 105 may transmit another reference signal occasion configuration to the UE 115.

In some cases, the UE 115 may identify windows during which the UE 115 can assume there are potential TRS/CSI-RS occasions. For example, the UE 115 may assume that there are TRS/CSI-RS occasions within a first window 420. However, the UE 115 may assume there are not TRS/CSI-RS occasions within a second window 425 after the first window 420. If in the active state, the UE 115 may monitor for CSI-RS, TRS, or both, during the updated TRS/CSI-RS occasions 410 in the first window 420. In some cases, the base station 105 may transmit an indication of the first window 420 and the second window 425. For example, timing information for the updated TRS/CSI-RS occasions 410 may be included with the TRS/CSI-RS occasion configuration.

In some cases, the UE 115 may receive an indication from the network to deactivate the TRS/CSI-RS configuration. For example, a base station 105 may transmit a TRS/CSI-RS deactivation message to the UE 115. In some cases, the UE 115 may revert to a previous operation after receiving the deactivation message. For example, the UE 115 may use SS/PBCH blocks for time/frequency tracking and radio resource management. In some cases, the deactivation message may be indicated as part of the TRS/CSI-RS occasion configuration or in paging DCI. In some cases, the base station 105 may transmit an activation message for the configuration. For example, the base station 105 may toggle (e.g., activate and deactivate) the configuration for the UE 115. The activation message may also be transmitted as part of the TRS/CSI-RS occasion configuration or in paging DCI.

Figure 5:
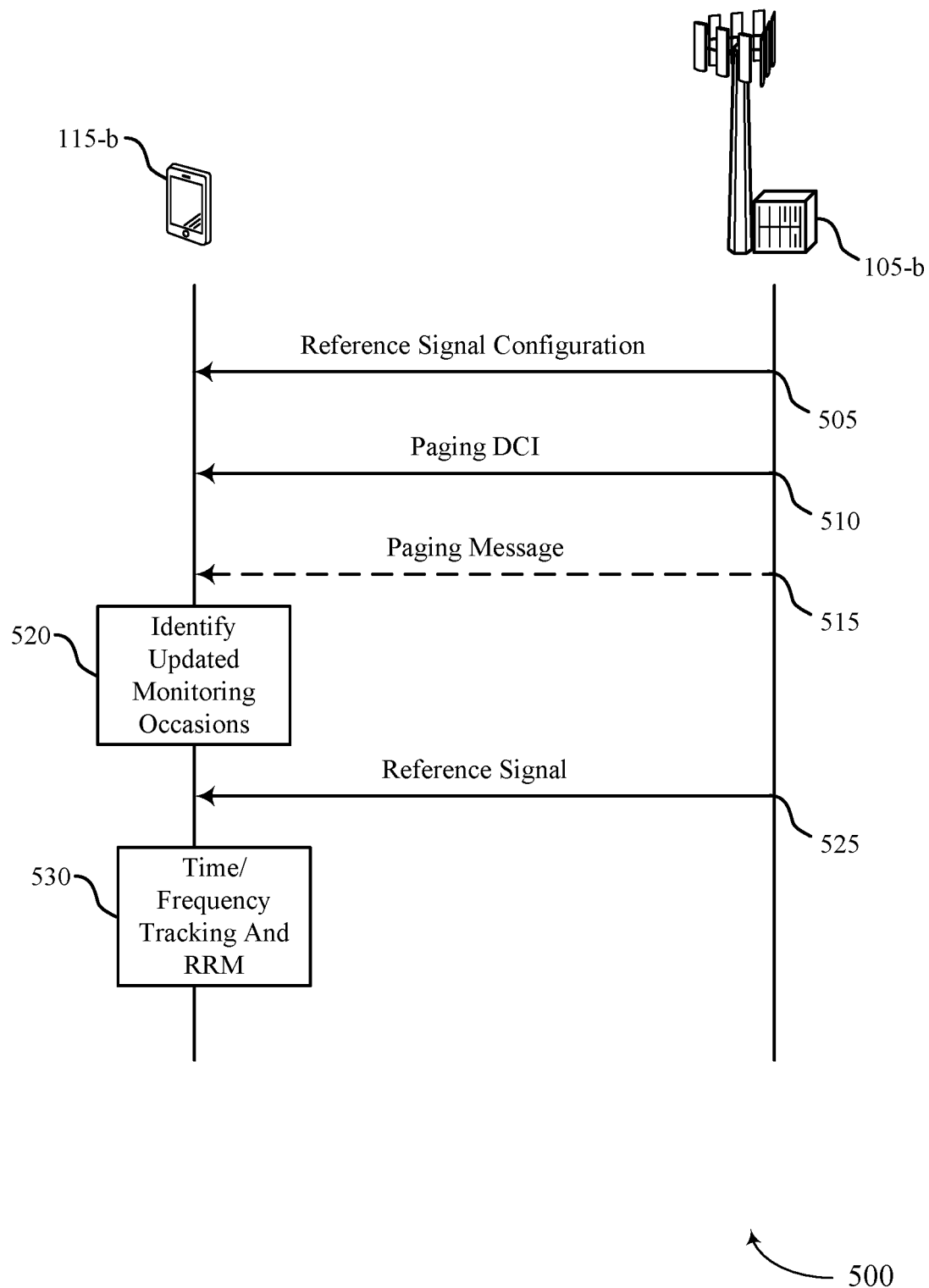
FIG. 5 illustrates an example of a process flow that supports reference signal monitoring occasion updates for idle and inactive UEs in accordance with aspects of the present disclosure.

FIG. 5 illustrates an example of a process flow 500 that supports reference signal monitoring occasion updates for idle and inactive UEs in accordance with aspects of the present disclosure. In some examples, the process flow 500 may implement aspects of wireless communication system 100. The process flow 500 may include UE 115-b and base station 105-b, which may be respective examples of a UE 115 and a base station 105 described herein.

At 505, UE 115-b may receive a reference signal configuration including a set of monitoring occasions for a reference signal associated with a connected mode. Each monitoring occasion may include time and frequency resources for transmission of the reference signal. In some cases, the monitoring occasions may be spread across time and frequency resources according to a pattern indicated in the reference signal configuration. In some cases, the occasions indicated in the reference signal configuration may be referred to as the initial set of reference signal occasions. The reference signal may be, for example, CSI-RS, TRS, or both. In some cases, a reference signal occasion may refer to an occasion for CSI-RS, TRS, or both.

At 510, UE 115-b may receive paging DCI while UE 115-b is operating in an idle mode or an inactive mode based on a change to the set of monitoring occasions for the reference signal. For example, UE 115-b may be in the idle mode or the inactive mode at 510, and base station 105-b may have an update for TRS/CSI-RS occasions. Base station 105-b may transmit the paging DCI at 510 to indicate the change to UE 115-b. In some cases, at 515, base station 105-*b* may transmit a paging message to UE 115-*b*. For example, the paging DCI may schedule UE 115-*b* for the paging message.

At 520, UE 115-*b* may identify an updated set of monitoring occasions for the reference signal based on receiving the paging downlink control information. In some cases, the paging DCI may include the indication of the updated set of monitoring occasions for the reference signal. In some cases, UE 115-*b* may monitor for the paging message based on receiving the paging DCI, and the paging message may include an indication of the updated set of monitoring occasions.

Base station 105-*b* may transmit the reference signals using the updated set of transmission occasions at 525. When UE 115-*b* is in the connected mode, UE 115-*b* may monitor for the reference signals at the updated occasions. UE 115-*b* may perform time and frequency tracking, radio resource management (e.g., RRM), or both, based on the reference signal received in the updated set of monitoring occasions at 530. For example, UE 115-*b* may measure a reference signal received power or a reference signal received quality of the reference signal and use the measurement to determine a radio resource management measurement relaxation.

Figure 6:
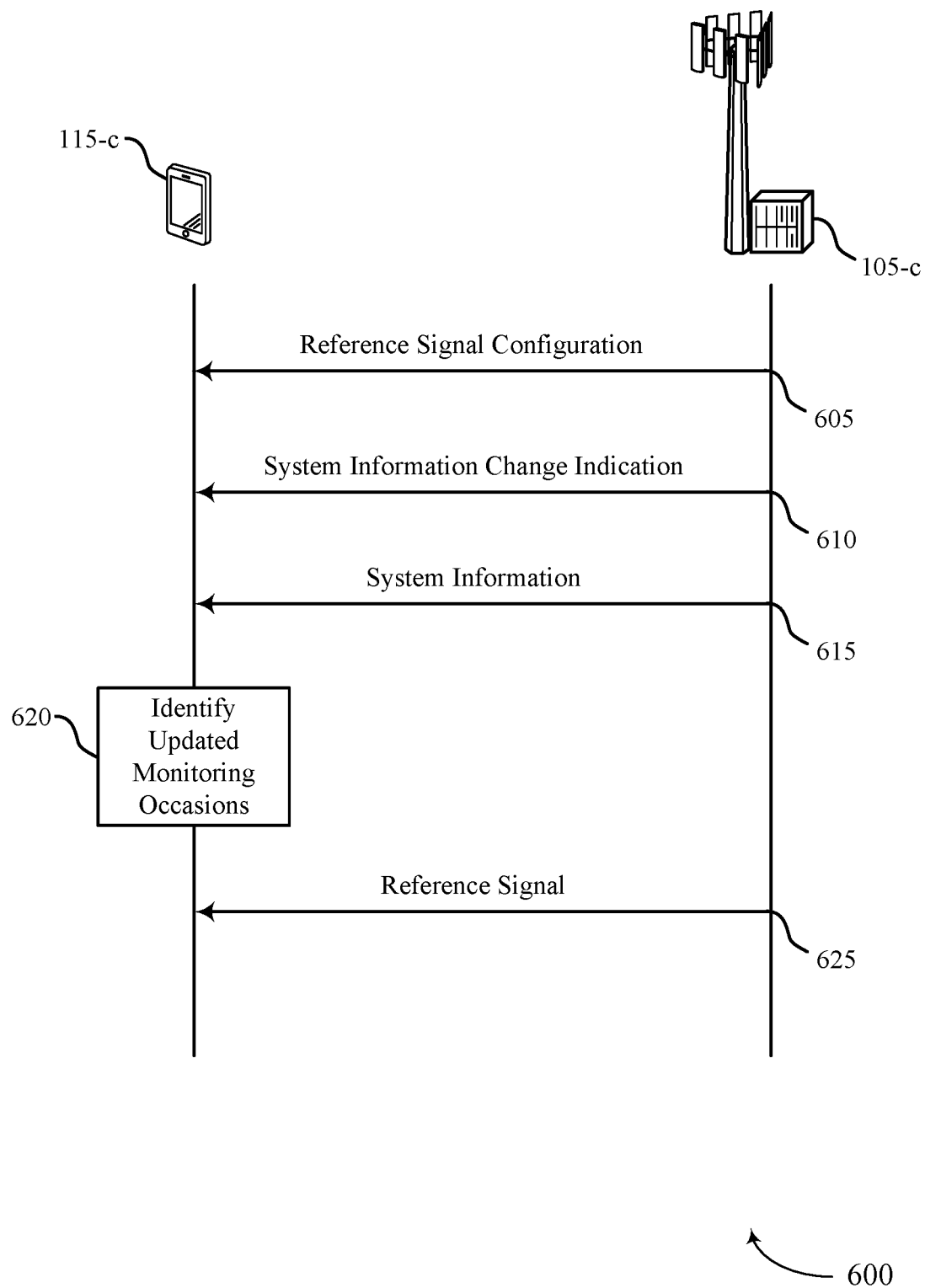
FIG. 6 illustrates an example of a process flow that supports reference signal monitoring occasion updates for idle and inactive UEs in accordance with aspects of the present disclosure.

FIG. 6 illustrates an example of a process flow 600 that supports reference signal monitoring occasion updates for idle and inactive UEs in accordance with aspects of the present disclosure. In some examples, the process flow 600 may implement aspects of wireless communication system 100. The process flow 600 may include UE 115-*c* and base station 105-*c*, which may be respective examples of a UE 115 and a base station 105 described herein.

At 605, UE 115-*c* may receive a reference signal configuration including a set of monitoring occasions for a reference signal associated with a connected mode. Each monitoring occasion may include time and frequency resources for transmission of the reference signal. In some cases, the monitoring occasions may be spread across time and frequency resources according to a pattern indicated in the reference signal configuration. In some cases, the occasions indicated in the reference signal configuration may be referred to as the initial set of reference signal occasions. The reference signal may be, for example, CSI-RS, TRS, or both. In some cases, a reference signal occasion may refer to an occasion for CSI-RS, TRS, or both.

At 610, UE 115-*c* may receive a system information change indication while UE 115-*c* is operating in an idle mode or an inactive mode based on a change to the set of monitoring occasions for the reference signal. For example, UE 115-*c* may be in the idle mode or the inactive mode at 610, and base station 105-*c* may have an update for TRS/CSI-RS occasions. Base station 105-*c* may transmit the system information change indication at 610 to indicate the change to UE 115-*c*. In some cases, base station 105-*c* may transmit the system information change indication during a paging occasion for UE 115-*c*. For example, the system information change indication may be transmitted via a paging signal, such as paging DCI or a paging message.

At 615, base station 105-*c* may transmit a system information message to UE 115-*c*. UE 115-*c* may receive the system information message indicating the updated set of monitoring occasions for the reference signal. At 620, UE 115-*c* may identify the updated set of monitoring occasions for the reference signal based on receiving the system information message.

Base station 105-*c* may transmit the reference signals using the updated set of transmission occasions at 620. When UE 115-*c* is in the connected mode, UE 115-*c* may monitor for the reference signals at the updated occasions. UE 115-*c* may perform time and frequency tracking, radio resource management (e.g., RRM), or both, based on the reference signal received in the updated set of monitoring occasions. For example, UE 115-*c* may measure a reference signal received power or a reference signal received quality of the reference signal and use the measurement to determine a radio resource management measurement relaxation.

Figure 7:
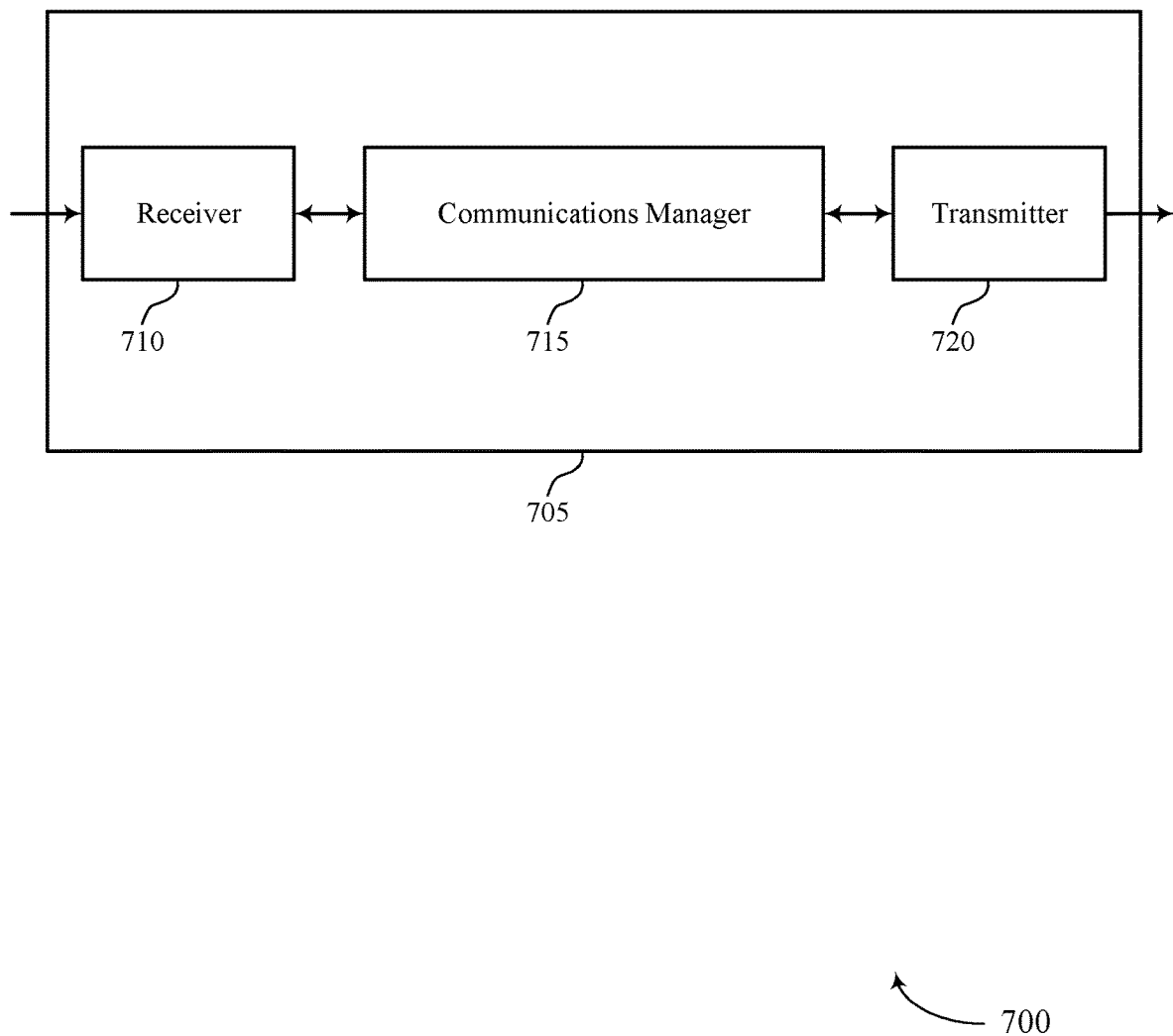
FIGS. 7 and 8 show block diagrams of devices that support reference signal monitoring occasion updates for idle and inactive UEs in accordance with aspects of the present disclosure.

FIG. 7 shows a block diagram 700 of a device 705 that supports reference signal monitoring occasion updates for idle and inactive UEs in accordance with aspects of the present disclosure. The device 705 may be an example of aspects of a UE 115 as described herein. The device 705 may include a receiver 710, a communications manager 715, and a transmitter 720. The device 705 may also include a processor. Each of these components may be in communication with one another (e.g., via one or more buses).

The receiver 710 may receive information such as packets, user data, or control information associated with various information channels (e.g., control channels, data channels, and information related to reference signal monitoring occasion updates for idle and inactive UEs, etc.). Information may be passed on to other components of the device 705. The receiver 710 may be an example of aspects of the transceiver 1020 described with reference to FIG. 10. The receiver 710 may utilize a single antenna or a set of antennas.

The communications manager 715 may receive a reference signal configuration including a set of monitoring occasions for a reference signal associated with a connected mode, where each monitoring occasion includes time and frequency resources for transmission of the reference signal, receive paging downlink control information while operating in an idle mode or an inactive mode based on a change to the set of monitoring occasions for the reference signal, identify an updated set of monitoring occasions for the reference signal based on receiving the paging downlink control information, and perform time and frequency tracking or a radio resource management measurement based on the reference signal received in the updated set of monitoring occasions.

The communications manager 715 may also receive a reference signal configuration including a set of monitoring occasions for a reference signal associated with a connected mode, where each monitoring occasion includes time and frequency resources for transmission of the reference signal, receive a system information change indication while operating in an idle mode or an inactive mode based on a change to the set of monitoring occasions for the reference signal, receive a system information message indicating an updated set of monitoring occasions for the reference signal based on receiving the system information change indication, and perform time and frequency tracking or a radio resource management measurement based on the reference signal received in the updated set of monitoring occasions.

The communications manager 715 may also receive system information indicating a set of monitoring occasions for a reference signal associated with a connected mode, where each monitoring occasion comprises time and frequency resources for transmission of the reference signal, receive a paging signal including a system information change indication while operating in an idle mode or an inactive mode based on a change to the set of monitoring occasions for the reference signal, identify an updated set of monitoring occasions for the reference signal based on receiving updated system information based on the system information change indication in the paging signal, and perform time and frequency tracking or a radio resource management measurement based on the reference signal received in the updated set of monitoring occasions. The communications manager 715 may be an example of aspects of the communications manager 1010 described herein.

The communications manager 715, or its sub-components, may be implemented in hardware, code (e.g., software) executed by a processor, or any combination thereof. If implemented in code executed by a processor, the functions of the communications manager 715, or its sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure.

The communications manager 715, or its sub-components, may be physically located at various positions, including being distributed such that portions of functions are implemented at different physical locations by one or more physical components. In some examples, the communications manager 715, or its sub-components, may be a separate and distinct component in accordance with various aspects of the present disclosure. In some examples, the communications manager 715, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 720 may transmit signals generated by other components of the device 705. In some examples, the transmitter 720 may be collocated with a receiver 710 in a transceiver module. For example, the transmitter 720 may be an example of aspects of the transceiver 1020 described with reference to FIG. 10. The transmitter 720 may utilize a single antenna or a set of antennas.

Figure 8:
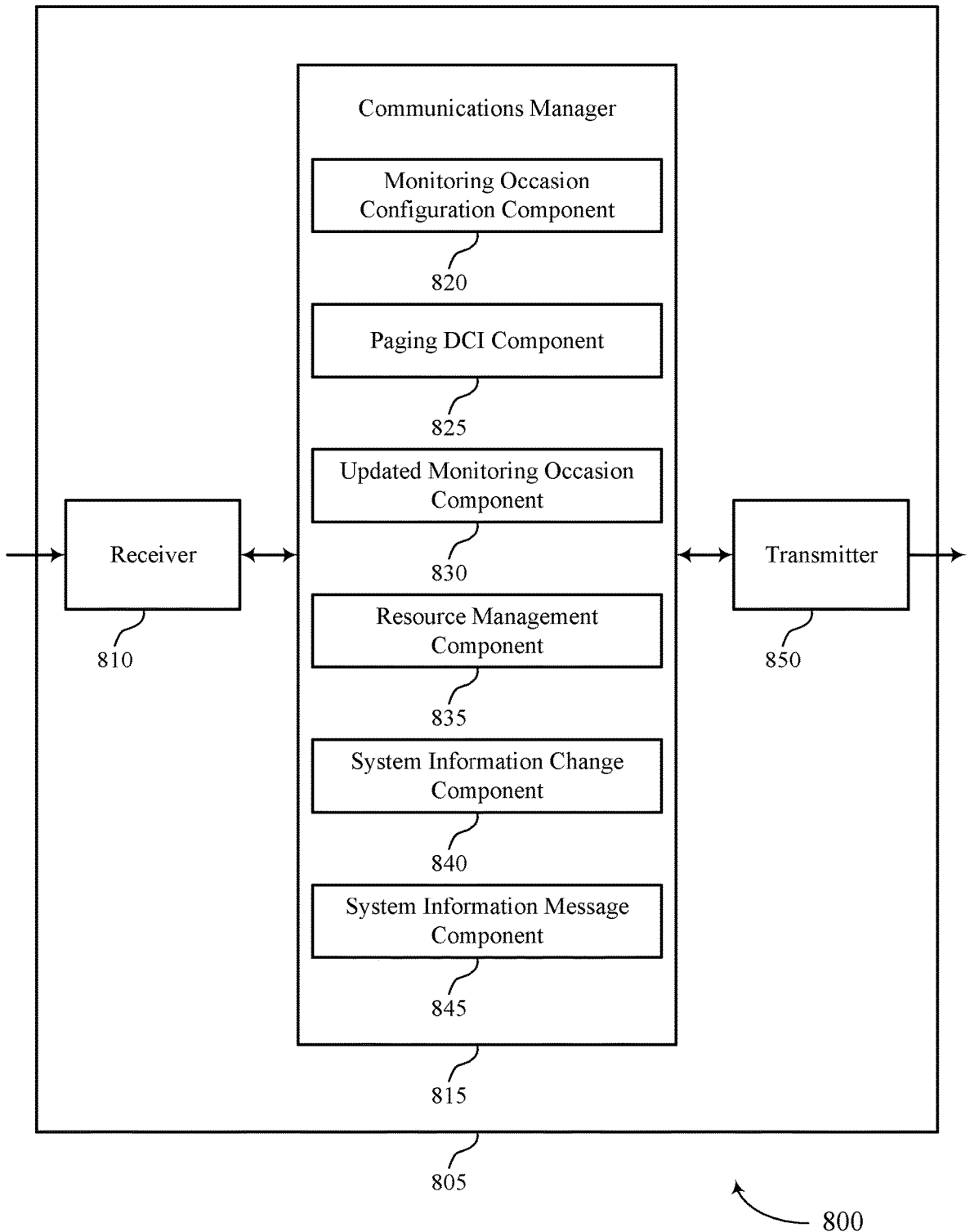

FIG. 8 shows a block diagram 800 of a device 805 that supports reference signal monitoring occasion updates for idle and inactive UEs in accordance with aspects of the present disclosure. The device 805 may be an example of aspects of a device 705, or a UE 115 as described herein. The device 805 may include a receiver 810, a communications manager 815, and a transmitter 850. The device 805 may also include a processor. Each of these components may be in communication with one another (e.g., via one or more buses).

The receiver 810 may receive information such as packets, user data, or control information associated with various information channels (e.g., control channels, data channels, and information related to reference signal monitoring occasion updates for idle and inactive UEs, etc.). Information may be passed on to other components of the device 805. The receiver 810 may be an example of aspects of the transceiver 1020 described with reference to FIG. 10. The receiver 810 may utilize a single antenna or a set of antennas.

The communications manager 815 may be an example of aspects of the communications manager 715 as described herein. The communications manager 815 may include a monitoring occasion configuration component 820, a paging DCI component 825, an updated monitoring occasion component 830, a resource management component 835, a system information change component 840, and a system information message component 845. The communications manager 815 may be an example of aspects of the communications manager 1010 described herein.

The monitoring occasion configuration component 820 may receive a reference signal configuration including a set of monitoring occasions for a reference signal associated with a connected mode, where each monitoring occasion includes time and frequency resources for transmission of the reference signal. The paging DCI component 825 may receive paging downlink control information while operating in an idle mode or an inactive mode based on a change to the set of monitoring occasions for the reference signal. The updated monitoring occasion component 830 may identify an updated set of monitoring occasions for the reference signal based on receiving the paging downlink control information. The resource management component 835 may perform time and frequency tracking or a radio resource management measurement based on the reference signal received in the updated set of monitoring occasions.

The monitoring occasion configuration component 820 may receive a reference signal configuration including a set of monitoring occasions for a reference signal associated with a connected mode, where each monitoring occasion includes time and frequency resources for transmission of the reference signal. The system information change component 840 may receive a system information change indication while operating in an idle mode or an inactive mode based on a change to the set of monitoring occasions for the reference signal. The system information message component 845 may receive a system information message indicating an updated set of monitoring occasions for the reference signal based on receiving the system information change indication. The resource management component 835 may perform time and frequency tracking or a radio resource management measurement based on the reference signal received in the updated set of monitoring occasions.

The transmitter 850 may transmit signals generated by other components of the device 805. In some examples, the transmitter 850 may be collocated with a receiver 810 in a transceiver module. For example, the transmitter 850 may be an example of aspects of the transceiver 1020 described with reference to FIG. 10. The transmitter 850 may utilize a single antenna or a set of antennas.

Figure 9:
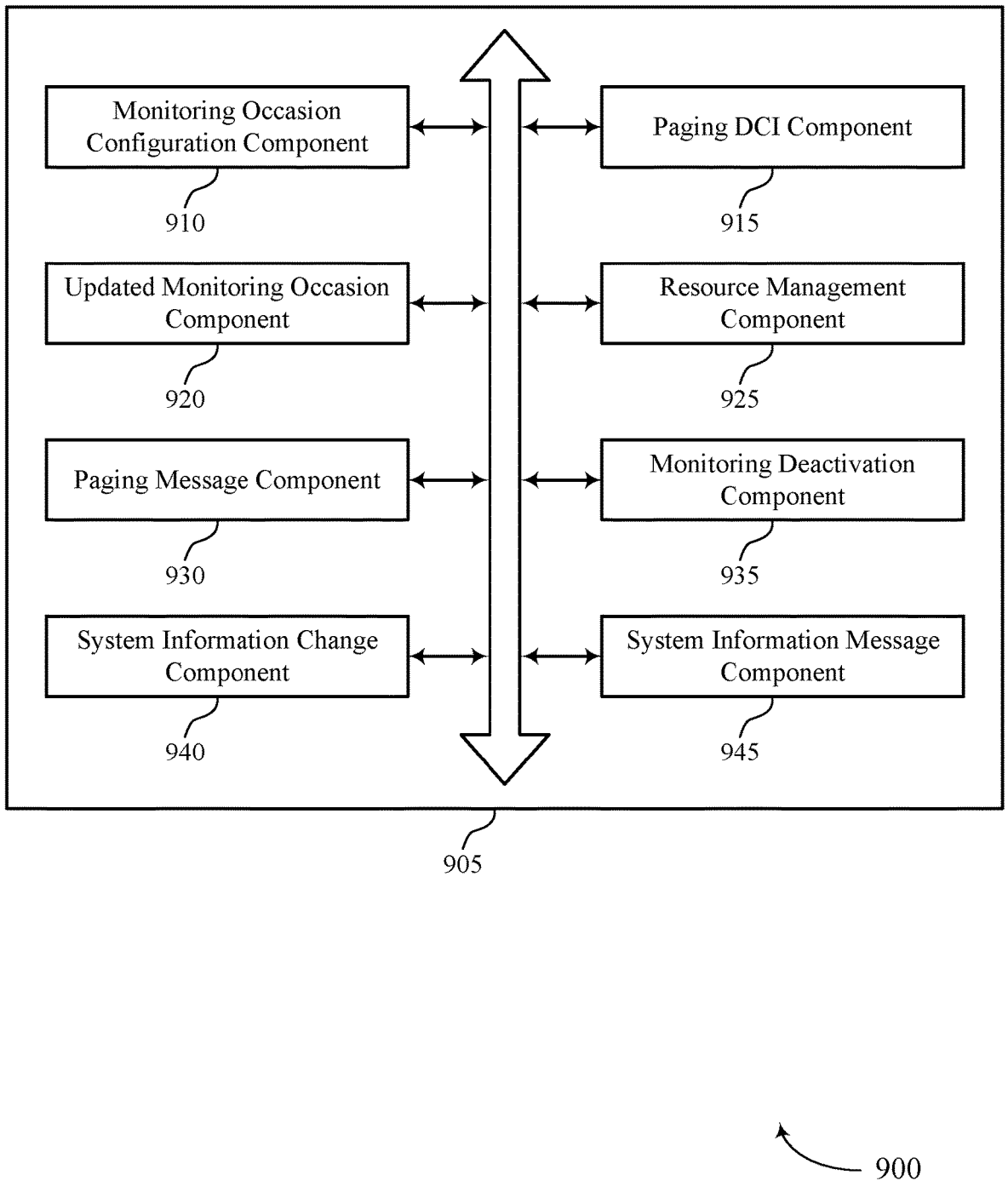
FIG. 9 shows a block diagram of a communications manager that supports reference signal monitoring occasion updates for idle and inactive UEs in accordance with aspects of the present disclosure.

FIG. 9 shows a block diagram 900 of a communications manager 905 that supports reference signal monitoring occasion updates for idle and inactive UEs in accordance with aspects of the present disclosure. The communications manager 905 may be an example of aspects of a communications manager 715, a communications manager 815, or a communications manager 1010 described herein. The communications manager 905 may include a monitoring occasion configuration component 910, a paging DCI component 915, an updated monitoring occasion component 920, a resource management component 925, a paging message component 930, a monitoring deactivation component 935, a system information change component 940, and a system information message component 945. Each of these modules may communicate, directly or indirectly, with one another (e.g., via one or more buses).

The monitoring occasion configuration component 910 may receive a reference signal configuration including a set of monitoring occasions for a reference signal associated with a connected mode, where each monitoring occasion includes time and frequency resources for transmission of the reference signal. In some examples, receiving a reference signal configuration including a set of monitoring occasions for a reference signal associated with a connected mode, where each monitoring occasion includes time and frequency resources for transmission of the reference signal. In some cases, the reference signal includes a tracking reference signal, a channel state information reference signal, or both.

The paging DCI component 915 may receive paging downlink control information while operating in an idle mode or an inactive mode based on a change to the set of monitoring occasions for the reference signal. In some cases, the paging downlink control information includes an indication of the updated set of monitoring occasions for the reference signal. In some cases, the paging downlink control information includes a paging identifier, a UE group identifier, or both. In some cases, the paging downlink control information schedules a paging downlink shared channel.

The updated monitoring occasion component 920 may identify an updated set of monitoring occasions for the reference signal based on receiving the paging downlink control information. In some examples, the updated monitoring occasion component 920 may apply a configuration associated with the updated set of monitoring occasions until a reception of a reconfiguration for the updated set of monitoring occasions. In some cases, a periodicity of the updated set of monitoring occasions is the same as or different from a periodicity of paging occasions for the UE.

The resource management component 925 may perform time and frequency tracking or a radio resource management measurement based on the reference signal received in the updated set of monitoring occasions. In some examples, the resource management component 925 may perform time and frequency tracking or a radio resource management measurement based on the reference signal received in the updated set of monitoring occasions.

In some examples, the resource management component 925 may receive the reference signal during the updated set of monitoring occasions. In some examples, the resource management component 925 may measure a signal characteristic of the reference signal. In some examples, the resource management component 925 may determine a radio resource management measurement condition based on the signal characteristic.

The system information change component 940 may receive a system information change indication while operating in an idle mode or an inactive mode based on a change to the set of monitoring occasions for the reference signal. The system information message component 945 may receive a system information message indicating an updated set of monitoring occasions for the reference signal based on receiving the system information change indication.

The paging message component 930 may monitor for a paging message including an indication of the updated set of monitoring occasions based on receiving the paging downlink control information. In some cases, the paging downlink control information includes a bit indicating that the paging message includes an updated configuration for just the reference signal. In some cases, the paging downlink control information includes a bit indicating that the paging message includes the indication of the updated set of monitoring occasions. In some cases, the bit indicating that the paging message includes the indication of the updated set of monitoring occasions corresponds to a reserved bit. In some cases, the bit indicating that the paging message includes the indication of the updated set of monitoring occasions corresponds to a repurposed bit. In some cases, the paging downlink control information includes a bit indicating that the paging message includes a configuration for a tracking reference signal and not a configuration for a channel state information reference signal.

The monitoring deactivation component 935 may apply a configuration associated with the updated set of monitoring occasions until a reception of a reconfiguration for the updated set of monitoring occasions.

In some examples, the monitoring deactivation component 935 may identify a reference signal occasion window, where the UE assumes that the reference signal is transmitted by a base station at reference signal occasions within the reference signal occasion window. In some examples, the monitoring deactivation component 935 may monitor for the reference signal in the updated set of monitoring occasions within the reference signal occasion window. In some examples, the monitoring deactivation component 935 may receive, from a base station, a deactivation message for the updated set of monitoring occasions.

In some examples, the monitoring deactivation component 935 may refrain from monitoring for the reference signal in the updated set of monitoring occasions after receiving the deactivation message. In some examples, the monitoring deactivation component 935 may monitor for a synchronization signal block for the time and frequency tracking and radio resource management after receiving the deactivation message. In some cases, the deactivation message is received in a reconfiguration message for the set of monitoring occasions or in downlink control information.

Figure 10:
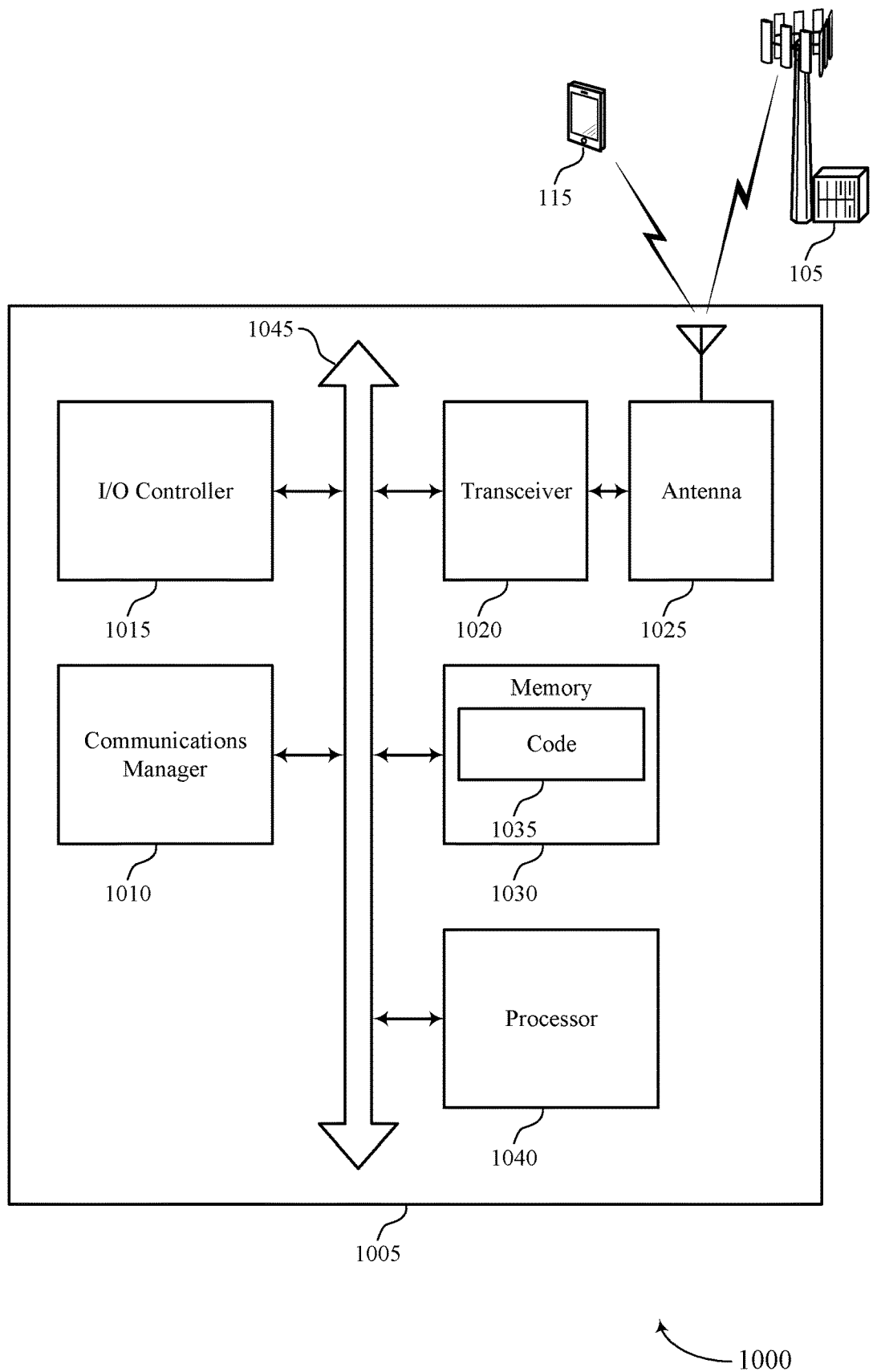
FIG. 10 shows a diagram of a system including a device that supports reference signal monitoring occasion updates for idle and inactive UEs in accordance with aspects of the present disclosure.

FIG. 10 shows a diagram of a system 1000 including a device 1005 that supports reference signal monitoring occasion updates for idle and inactive UEs in accordance with aspects of the present disclosure. The device 1005 may be an example of or include the components of device 705, device 805, or a UE 115 as described herein. The device 1005 may include components for bi-directional voice and data communications including components for transmitting and receiving communications, including a communications manager 1010, an I/O controller 1015, a transceiver 1020, an antenna 1025, memory 1030, and a processor 1040. These components may be in electronic communication via one or more buses (e.g., bus 1045).

The communications manager 1010 may receive a reference signal configuration including a set of monitoring occasions for a reference signal associated with a connected mode, where each monitoring occasion includes time and frequency resources for transmission of the reference signal, receive paging downlink control information while operating in an idle mode or an inactive mode based on a change to the set of monitoring occasions for the reference signal, identify an updated set of monitoring occasions for the reference signal based on receiving the paging downlink control information, and perform time and frequency tracking or a radio resource management measurement based on the reference signal received in the updated set of monitoring occasions.

The communications manager 1010 may also receive a reference signal configuration including a set of monitoring occasions for a reference signal associated with a connected mode, where each monitoring occasion includes time and frequency resources for transmission of the reference signal, receive a system information change indication while operating in an idle mode or an inactive mode based on a change to the set of monitoring occasions for the reference signal, receive a system information message indicating an updated set of monitoring occasions for the reference signal based on receiving the system information change indication, and perform time and frequency tracking or a radio resource management measurement based on the reference signal received in the updated set of monitoring occasions.

The communications manager 1010 may also receive system information indicating a set of monitoring occasions for a reference signal associated with a connected mode, where each monitoring occasion comprises time and frequency resources for transmission of the reference signal, receive a paging signal including a system information change indication while operating in an idle mode or an inactive mode based on a change to the set of monitoring occasions for the reference signal, identify an updated set of monitoring occasions for the reference signal based on receiving updated system information based on the system information change indication in the paging signal, and perform time and frequency tracking or a radio resource management measurement based on the reference signal received in the updated set of monitoring occasions.

The I/O controller 1015 may manage input and output signals for the device 1005. The I/O controller 1015 may also manage peripherals not integrated into the device 1005. In some cases, the I/O controller 1015 may represent a physical connection or port to an external peripheral. In some cases, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some cases, the I/O controller 1015 may be implemented as part of a processor. In some cases, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some cases, the wireless device may include a single antenna 1025. However, in some cases the device may have more than one antenna 1025, which may be capable of concurrently transmitting or receiving multiple wireless transmissions.

The memory 1030 may include random-access memory (RAM) and read-only memory (ROM). The memory 1030 may store computer-readable, computer-executable code 1035 including instructions that, when executed (directly, after compiling, or after conversion, etc.,) by one or more processors (e.g., processor 1040), cause the one or more processors to perform various functions described herein. In some cases, the memory 1030 may contain, among other things, a basic input/output system (BIOS) which may control basic hardware or software operation such as the interaction with peripheral components or devices.

The processor 1040 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting reference signal monitoring occasion updates for idle and inactive UEs).

The code 1035 may include instructions to implement aspects of the present disclosure, including instructions to support wireless communications. The code 1035 may be stored in a non-transitory computer-readable medium such as system memory or other type of memory. In some cases, the code 1035 may not be directly executable by the processor 1040 but may cause a computer (e.g., when compiled and executed) to perform functions described herein.

Figure 11:
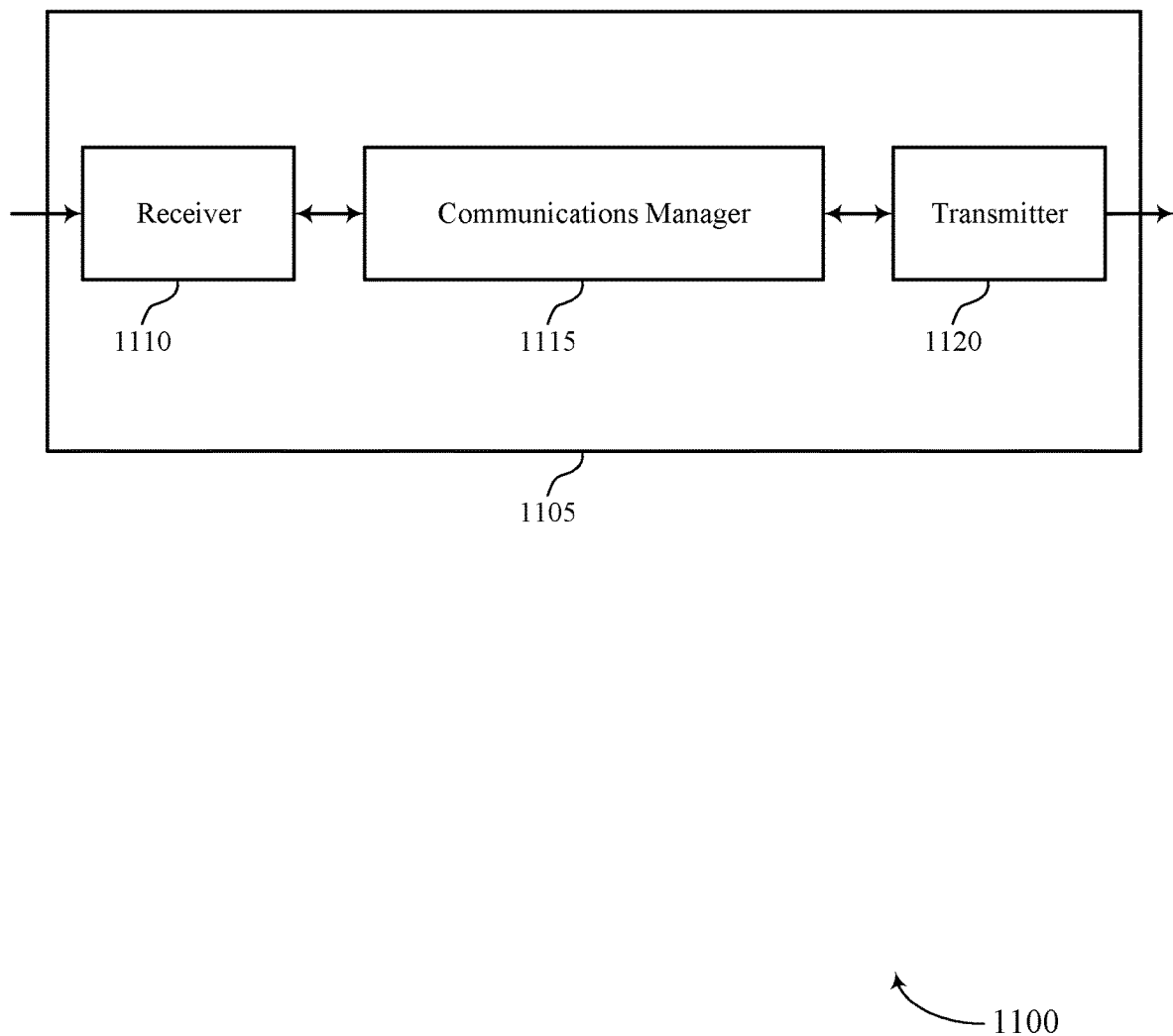
FIGS. 11 and 12 show block diagrams of devices that support reference signal monitoring occasion updates for idle and inactive UEs in accordance with aspects of the present disclosure.

FIG. 11 shows a block diagram 1100 of a device 1105 that supports reference signal monitoring occasion updates for idle and inactive UEs in accordance with aspects of the present disclosure. The device 1105 may be an example of aspects of a base station 105 as described herein. The device 1105 may include a receiver 1110, a communications manager 1115, and a transmitter 1120. The device 1105 may also include a processor. Each of these components may be in communication with one another (e.g., via one or more buses).

The receiver 1110 may receive information such as packets, user data, or control information associated with various information channels (e.g., control channels, data channels, and information related to reference signal monitoring occasion updates for idle and inactive UEs, etc.). Information may be passed on to other components of the device 1105. The receiver 1110 may be an example of aspects of the transceiver 1420 described with reference to FIG. 14. The receiver 1110 may utilize a single antenna or a set of antennas.

The communications manager 1115 may transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit paging downlink control information while the UE is operating in an inactive mode or an idle mode based on the change, and transmit the reference signal in the updated set of transmission occasions while the UE is operating in the connected mode. The communications manager 1115 may also transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit a system information change indication to the UE while the UE is operating in an inactive mode or an idle mode based on the change, transmit a system information message indicating the updated set of transmission occasions for the reference signal, and transmit the reference signal in the updated set of transmission occasions while the UE is operating in the connected mode. The communications manager 1115 may be an example of aspects of the communications manager 1410 described herein.

The communications manager 1115, or its sub-components, may be implemented in hardware, code (e.g., software) executed by a processor, or any combination thereof. If implemented in code executed by a processor, the functions of the communications manager 1115, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1115, or its sub-components, may be physically located at various positions, including being distributed such that portions of functions are implemented at different physical locations by one or more physical components. In some examples, the communications manager 1115, or its sub-components, may be a separate and distinct component in accordance with various aspects of the present disclosure. In some examples, the communications manager 1115, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1120 may transmit signals generated by other components of the device 1105. In some examples, the transmitter 1120 may be collocated with a receiver 1110 in a transceiver module. For example, the transmitter 1120 may be an example of aspects of the transceiver 1420 described with reference to FIG. 14. The transmitter 1120 may utilize a single antenna or a set of antennas.

Figure 12:
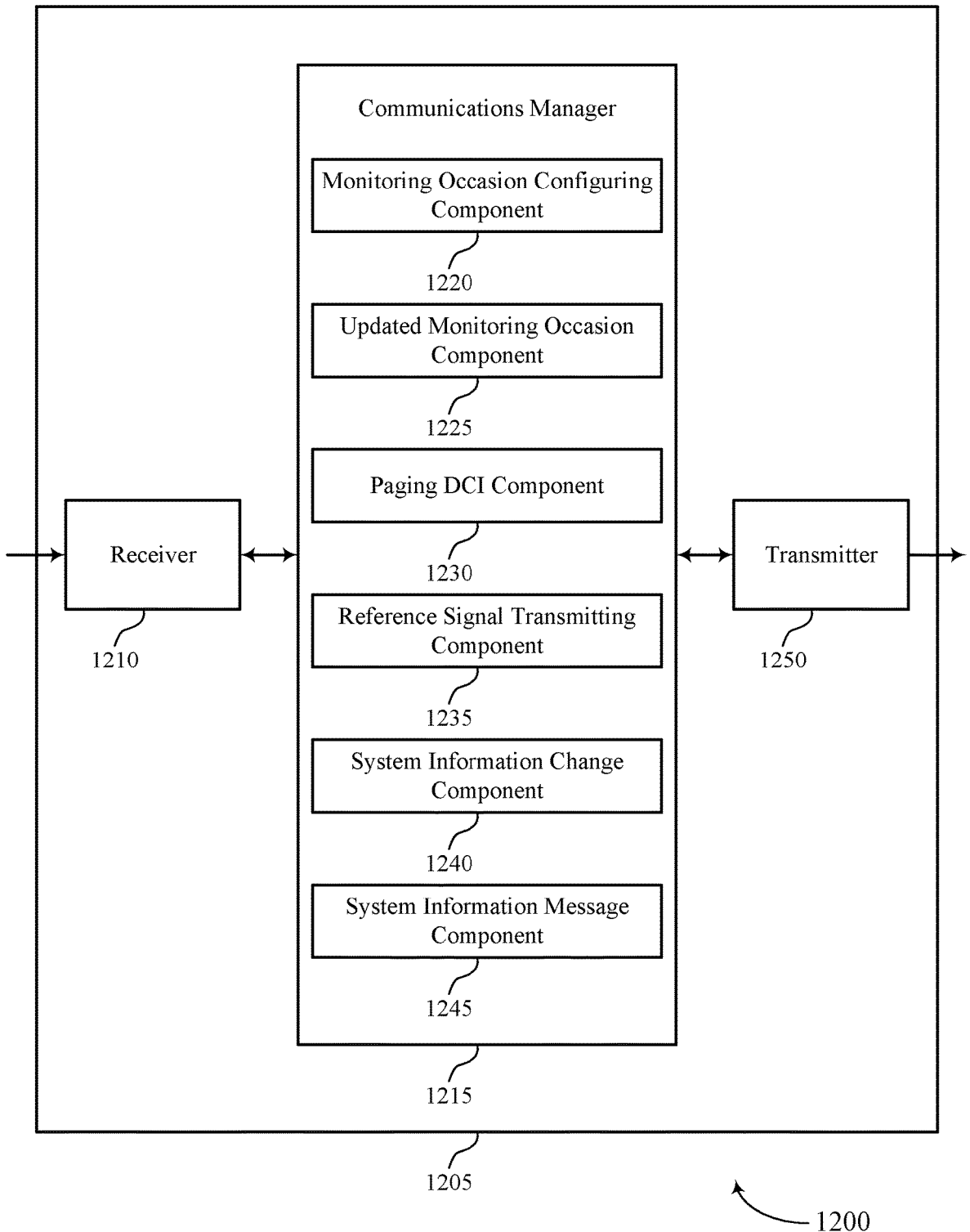

FIG. 12 shows a block diagram 1200 of a device 1205 that supports reference signal monitoring occasion updates for idle and inactive UEs in accordance with aspects of the present disclosure. The device 1205 may be an example of aspects of a device 1105, or a base station 105 as described herein. The device 1205 may include a receiver 1210, a communications manager 1215, and a transmitter 1250. The device 1205 may also include a processor. Each of these components may be in communication with one another (e.g., via one or more buses).

The receiver 1210 may receive information such as packets, user data, or control information associated with various information channels (e.g., control channels, data channels, and information related to reference signal monitoring occasion updates for idle and inactive UEs, etc.). Information may be passed on to other components of the device 1205. The receiver 1210 may be an example of aspects of the transceiver 1420 described with reference to FIG. 14. The receiver 1210 may utilize a single antenna or a set of antennas.

The communications manager 1215 may be an example of aspects of the communications manager 1115 as described herein. The communications manager 1215 may include a monitoring occasion configuring component 1220, an updated monitoring occasion component 1225, a paging DCI component 1230, a reference signal transmitting component 1235, a system information change component 1240, and a system information message component 1245. The communications manager 1215 may be an example of aspects of the communications manager 1410 described herein.

The monitoring occasion configuring component 1220 may transmit, to a UE, a reference signal configuration including a set of transmission occasions for a reference signal associated with a connected mode, where each transmission occasion includes time and frequency resources for transmitting the reference signal. The updated monitoring occasion component 1225 may determine an updated set of transmission occasions for the reference signal based on a change to the set of transmission occasions. The paging DCI component 1230 may transmit paging downlink control information while the UE is operating in an inactive mode or an idle mode based on the change. The reference signal transmitting component 1235 may transmit the reference signal in the updated set of transmission occasions while the UE is operating in the connected mode.

The monitoring occasion configuring component 1220 may transmit, to a UE, a reference signal configuration including a set of transmission occasions for a reference signal associated with a connected mode, where each transmission occasion includes time and frequency resources for transmitting the reference signal. The updated monitoring occasion component 1225 may determine an updated set of transmission occasions for the reference signal based on a change to the set of transmission occasions. The system information change component 1240 may transmit a system information change indication to the UE while the UE is operating in an inactive mode or an idle mode based on the change. The system information message component 1245 may transmit a system information message indicating the updated set of transmission occasions for the reference signal. The reference signal transmitting component 1235 may transmit the reference signal in the updated set of transmission occasions while the UE is operating in the connected mode.

The transmitter 1250 may transmit signals generated by other components of the device 1205. In some examples, the transmitter 1250 may be collocated with a receiver 1210 in a transceiver module. For example, the transmitter 1250 may be an example of aspects of the transceiver 1420 described with reference to FIG. 14. The transmitter 1250 may utilize a single antenna or a set of antennas.

Figure 13:
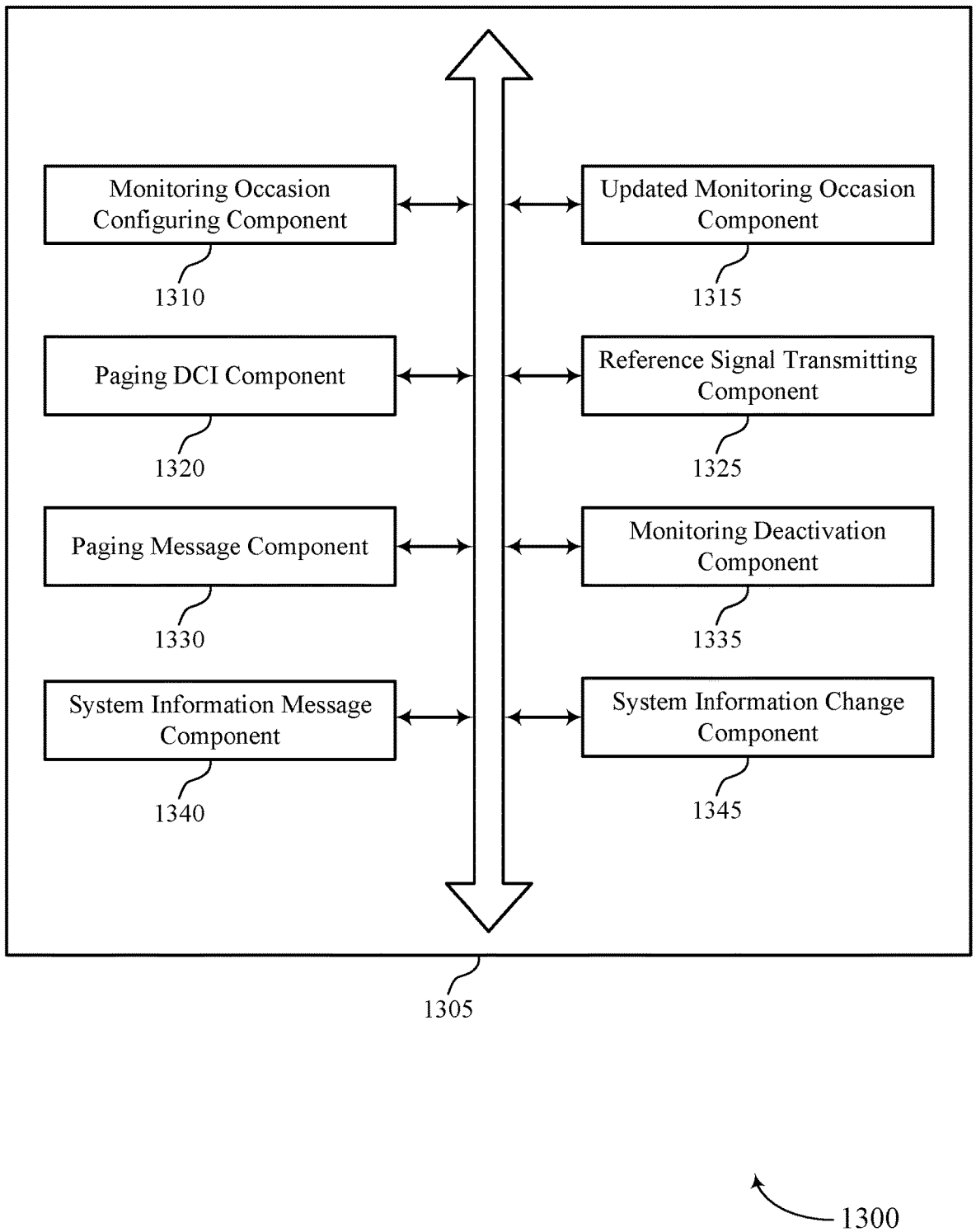
FIG. 13 shows a block diagram of a communications manager that supports reference signal monitoring occasion updates for idle and inactive UEs in accordance with aspects of the present disclosure.

FIG. 13 shows a block diagram 1300 of a communications manager 1305 that supports reference signal monitoring occasion updates for idle and inactive UEs in accordance with aspects of the present disclosure. The communications manager 1305 may be an example of aspects of a communications manager 1115, a communications manager 1215, or a communications manager 1410 described herein. The communications manager 1305 may include a monitoring occasion configuring component 1310, an updated monitoring occasion component 1315, a paging DCI component 1320, a reference signal transmitting component 1325, a paging message component 1330, a monitoring deactivation component 1335, a monitoring occasion configuration component 1340, a system information change component 1345, and a system information message component 1350. Each of these modules may communicate, directly or indirectly, with one another (e.g., via one or more buses).

The monitoring occasion configuring component 1310 may transmit, to a UE, a reference signal configuration including a set of transmission occasions for a reference signal associated with a connected mode, where each transmission occasion includes time and frequency resources for transmitting the reference signal. In some examples, transmitting, to a UE, a reference signal configuration including a set of transmission occasions for a reference signal associated with a connected mode, where each transmission occasion includes time and frequency resources for transmitting the reference signal.

The updated monitoring occasion component 1315 may determine an updated set of transmission occasions for the reference signal based on a change to the set of transmission occasions. In some examples, the updated monitoring occasion component 1315 may determine an updated set of transmission occasions for the reference signal based on a change to the set of transmission occasions.

In some examples, the updated monitoring occasion component 1315 may transmit a reconfiguration for the updated set of transmission occasions, where the reference signal is transmitted based on the reconfiguration after transmitting the reconfiguration. In some cases, a periodicity of the updated set of transmission occasions corresponds to a periodicity of paging occasions for the UE. In some cases, a periodicity of the updated set of transmission occasions is the same as or different from a periodicity of paging occasions for the UE.

The paging DCI component 1320 may transmit paging downlink control information while the UE is operating in an inactive mode or an idle mode based on the change. In some cases, the paging downlink control information includes an indication of the updated set of transmission occasions for the reference signal. In some cases, the paging downlink control information includes a paging identifier, a UE group identifier, or both. In some cases, the paging downlink control information schedules a paging downlink shared channel.

The reference signal transmitting component 1325 may transmit the reference signal in the updated set of transmission occasions while the UE is operating in the connected mode. The system information message component 1350 may transmit a system information message indicating the updated set of transmission occasions for the reference signal. The system information change component 1345 may transmit a system information change indication to the UE while the UE is operating in an inactive mode or an idle mode based on the change.

The paging message component 1330 may transmit a paging message including an indication of the updated set of transmission occasions based on transmitting the paging downlink control information. In some cases, the paging downlink control information includes a bit indicating that a configuration includes an updated configuration for just the reference signal. In some cases, the paging downlink control information includes a bit indicating that the paging message includes the indication of the updated set of transmission occasions.

In some cases, the bit indicating that the paging message includes the indication of the updated set of transmission occasions corresponds to a reserved bit. In some cases, the bit indicating that the paging message includes the indication of the updated set of transmission occasions corresponds to a repurposed bit. In some cases, the paging downlink control information includes a bit indicating that the paging message includes a configuration for a tracking reference signal and not a configuration for a channel state information reference signal.

The monitoring deactivation component 1335 may transmit a deactivation message to the UE for the updated set of transmission occasions. In some cases, the deactivation message is transmitted in a reconfiguration message for the set of transmission occasions or in downlink control information. In some cases, the reference signal includes a tracking reference signal, a channel state information reference signal, or both.

Figure 14:
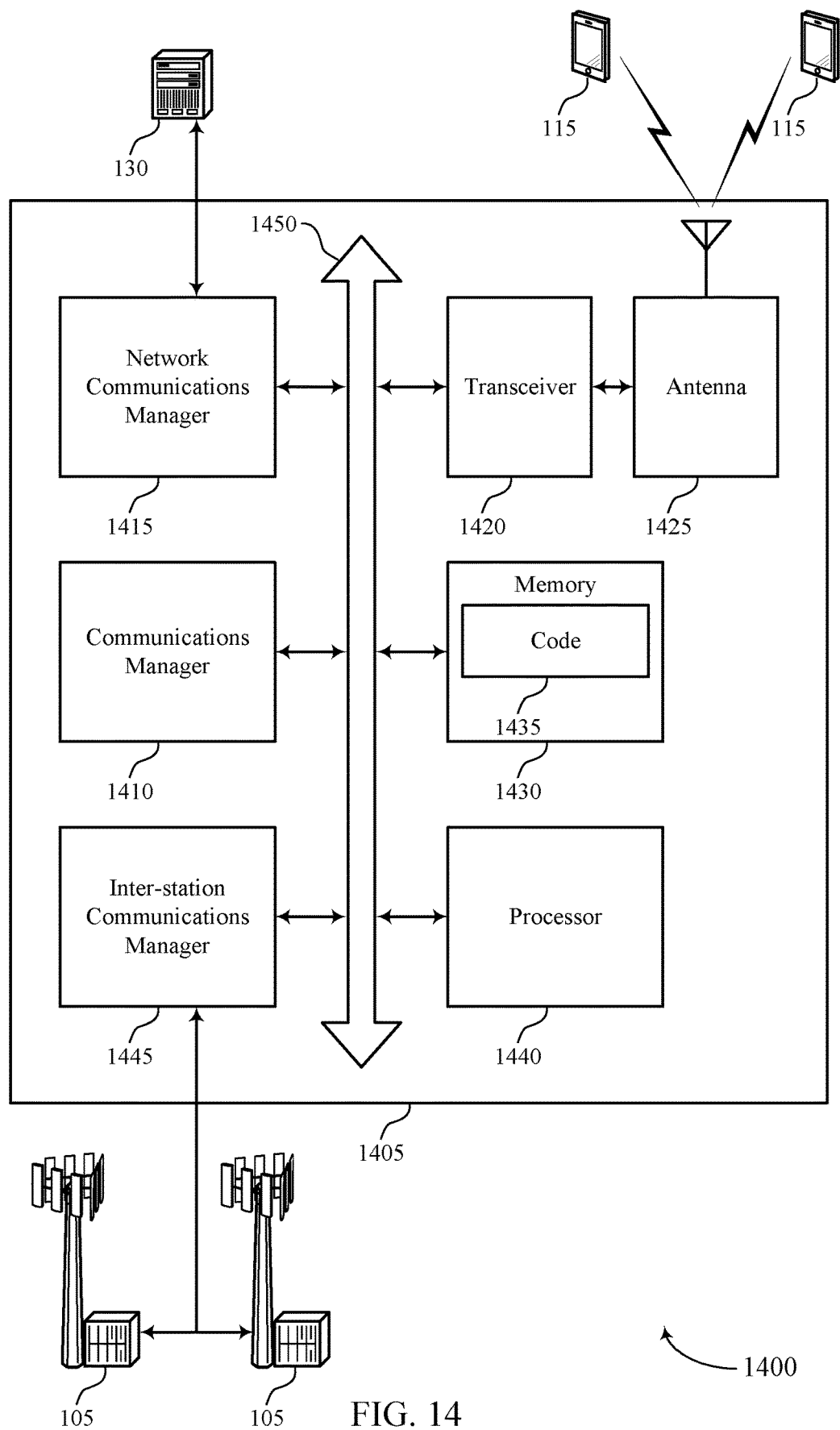
FIG. 14 shows a diagram of a system including a device that supports reference signal monitoring occasion updates for idle and inactive UEs in accordance with aspects of the present disclosure.

FIG. 14 shows a diagram of a system 1400 including a device 1405 that supports reference signal monitoring occasion updates for idle and inactive UEs in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a communications manager 1410, a network communications manager 1415, a transceiver 1420, an antenna 1425, memory 1430, a processor 1440, and an inter-station communications manager 1445. These components may be in electronic communication via one or more buses (e.g., bus 1450).

The communications manager 1410 may transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit paging downlink control information while the UE is operating in an inactive mode or an idle mode based on the change, and transmit the reference signal in the updated set of transmission occasions while the UE is operating in the connected mode.

The communications manager 1410 may also transmit, to a UE, a reference signal configuration including a set of transmission occasions for a reference signal associated with a connected mode, where each transmission occasion includes time and frequency resources for transmitting the reference signal, determine an updated set of transmission occasions for the reference signal based on a change to the set of transmission occasions, transmit a system information change indication to the UE while the UE is operating in an inactive mode or an idle mode based on the change, transmit a system information message indicating the updated set of transmission occasions for the reference signal, and transmit the reference signal in the updated set of transmission occasions while the UE is operating in the connected mode.

The network communications manager 1415 may manage communications with the core network (e.g., via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some cases, the wireless device may include a single antenna 1425. However, in some cases the device may have more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (e.g., the processor 1440) cause the device to perform various functions described herein. In some cases, the memory 1430 may contain, among other things, a BIOS which may control basic hardware or software operation such as the interaction with peripheral components or devices.

The processor 1440 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some cases, a memory controller may be integrated into processor 1440. The processor 1440 may be configured to execute computer-readable instructions stored in a memory (e.g., the memory 1430) to cause the device 1405 to perform various functions (e.g., functions or tasks supporting reference signal monitoring occasion updates for idle and inactive UEs).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some cases, the code 1435 may not be directly executable by the processor 1440 but may cause a computer (e.g., when compiled and executed) to perform functions described herein.

Figure 15:
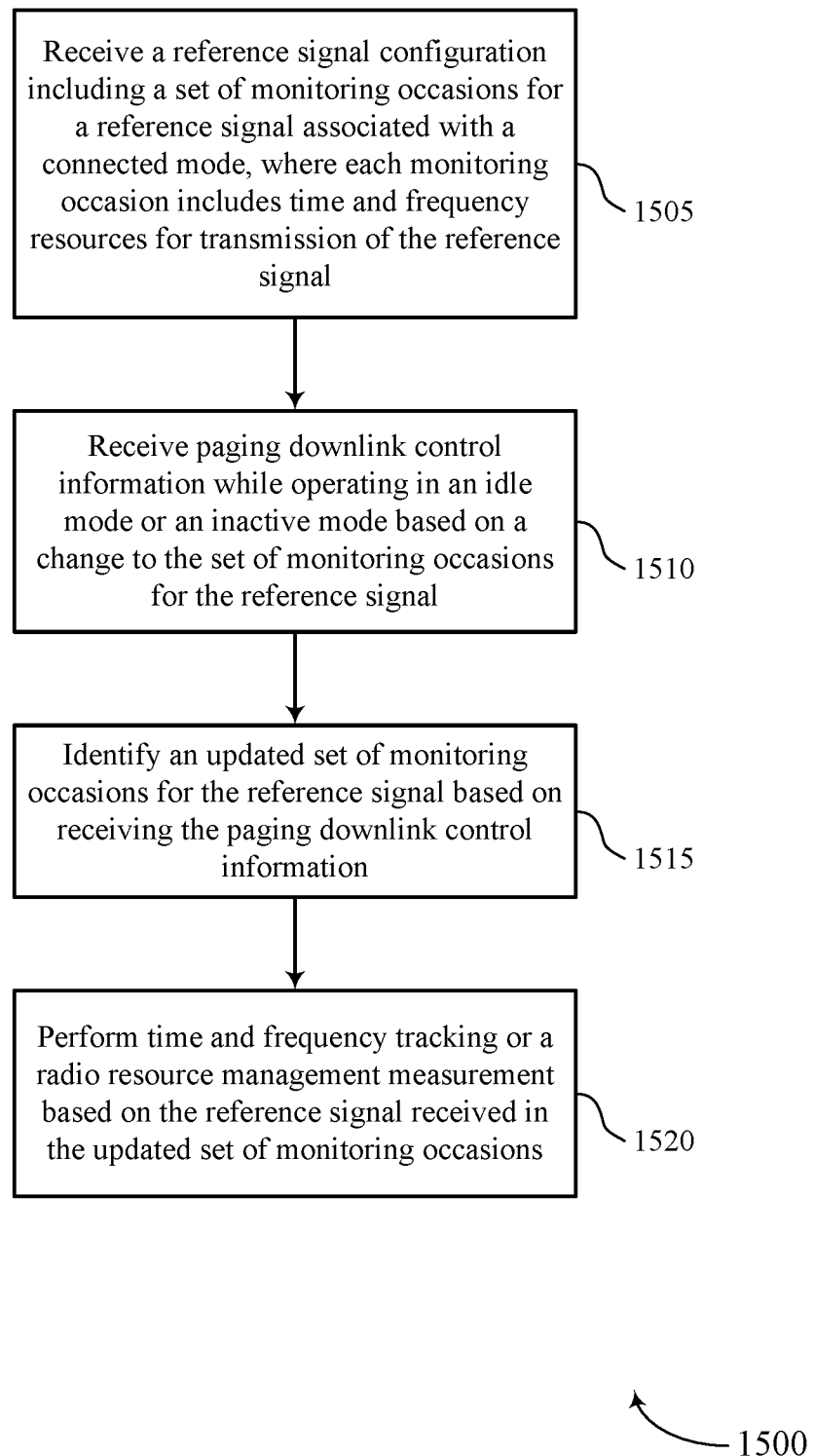
FIGS. 15 through 22 show flowcharts illustrating methods that support reference signal monitoring occasion updates for idle and inactive UEs in accordance with aspects of the present disclosure.

FIG. 15 shows a flowchart illustrating a method 1500 that supports reference signal monitoring occasion updates for idle and inactive UEs in accordance with aspects of the present disclosure. The operations of method 1500 may be implemented by a UE 115 or its components as described herein. For example, the operations of method 1500 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1505, the UE may receive a reference signal configuration including a set of monitoring occasions for a reference signal associated with a connected mode, where each monitoring occasion includes time and frequency resources for transmission of the reference signal. The operations of 1505 may be performed according to the methods described herein. In some examples, aspects of the operations of 1505 may be performed by a monitoring occasion configuration component as described with reference to FIGS. 7 through 10.

At 1510, the UE may receive paging downlink control information while operating in an idle mode or an inactive mode based on a change to the set of monitoring occasions for the reference signal. The operations of 1510 may be performed according to the methods described herein. In some examples, aspects of the operations of 1510 may be performed by a paging DCI component as described with reference to FIGS. 7 through 10.

At 1515, the UE may identify an updated set of monitoring occasions for the reference signal based on receiving the paging downlink control information. The operations of 1515 may be performed according to the methods described herein. In some examples, aspects of the operations of 1515 may be performed by an updated monitoring occasion component as described with reference to FIGS. 7 through 10.

At 1520, the UE may perform time and frequency tracking or a radio resource management measurement based on the reference signal received in the updated set of monitoring occasions. The operations of 1520 may be performed according to the methods described herein. In some examples, aspects of the operations of 1520 may be performed by a resource management component as described with reference to FIGS. 7 through 10.

Figure 16:
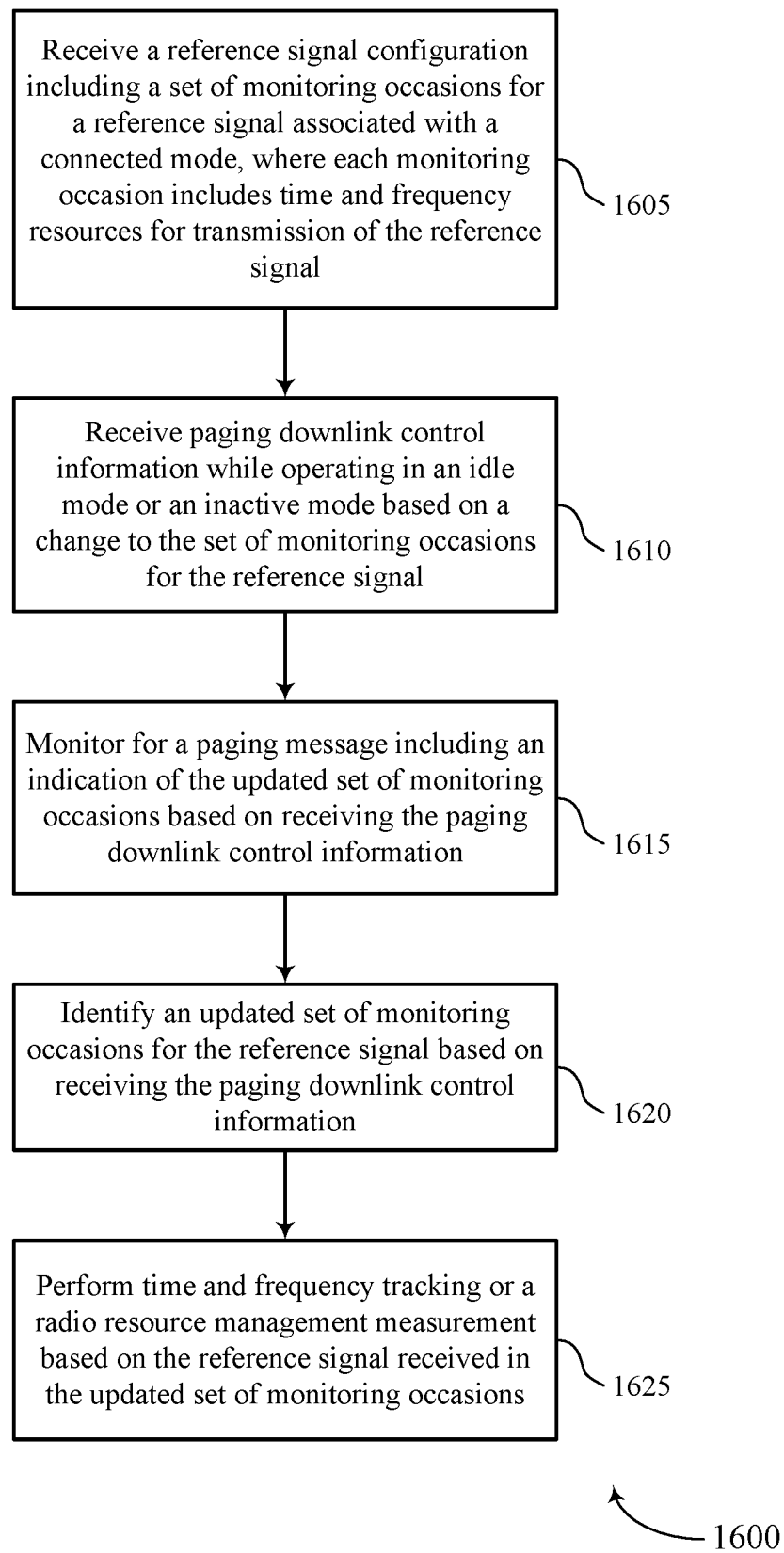

FIG. 16 shows a flowchart illustrating a method 1600 that supports reference signal monitoring occasion updates for idle and inactive UEs in accordance with aspects of the present disclosure. The operations of method 1600 may be implemented by a UE 115 or its components as described herein. For example, the operations of method 1600 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1605, the UE may receive a reference signal configuration including a set of monitoring occasions for a reference signal associated with a connected mode, where each monitoring occasion includes time and frequency resources for transmission of the reference signal. The operations of 1605 may be performed according to the methods described herein. In some examples, aspects of the operations of 1605 may be performed by a monitoring occasion configuration component as described with reference to FIGS. 7 through 10.

At 1610, the UE may receive paging downlink control information while operating in an idle mode or an inactive mode based on a change to the set of monitoring occasions for the reference signal. The operations of 1610 may be performed according to the methods described herein. In some examples, aspects of the operations of 1610 may be performed by a paging DCI component as described with reference to FIGS. 7 through 10.

At 1615, the UE may monitor for a paging message including an indication of the updated set of monitoring occasions based on receiving the paging downlink control information. The operations of 1615 may be performed according to the methods described herein. In some examples, aspects of the operations of 1615 may be performed by a paging message component as described with reference to FIGS. 7 through 10.

At 1620, the UE may identify an updated set of monitoring occasions for the reference signal based on receiving the paging downlink control information. The operations of 1620 may be performed according to the methods described herein. In some examples, aspects of the operations of 1620 may be performed by an updated monitoring occasion component as described with reference to FIGS. 7 through 10.

At 1625, the UE may perform time and frequency tracking or a radio resource management measurement based on the reference signal received in the updated set of monitoring occasions. The operations of 1625 may be performed according to the methods described herein. In some examples, aspects of the operations of 1625 may be performed by a resource management component as described with reference to FIGS. 7 through 10.

Figure 17:
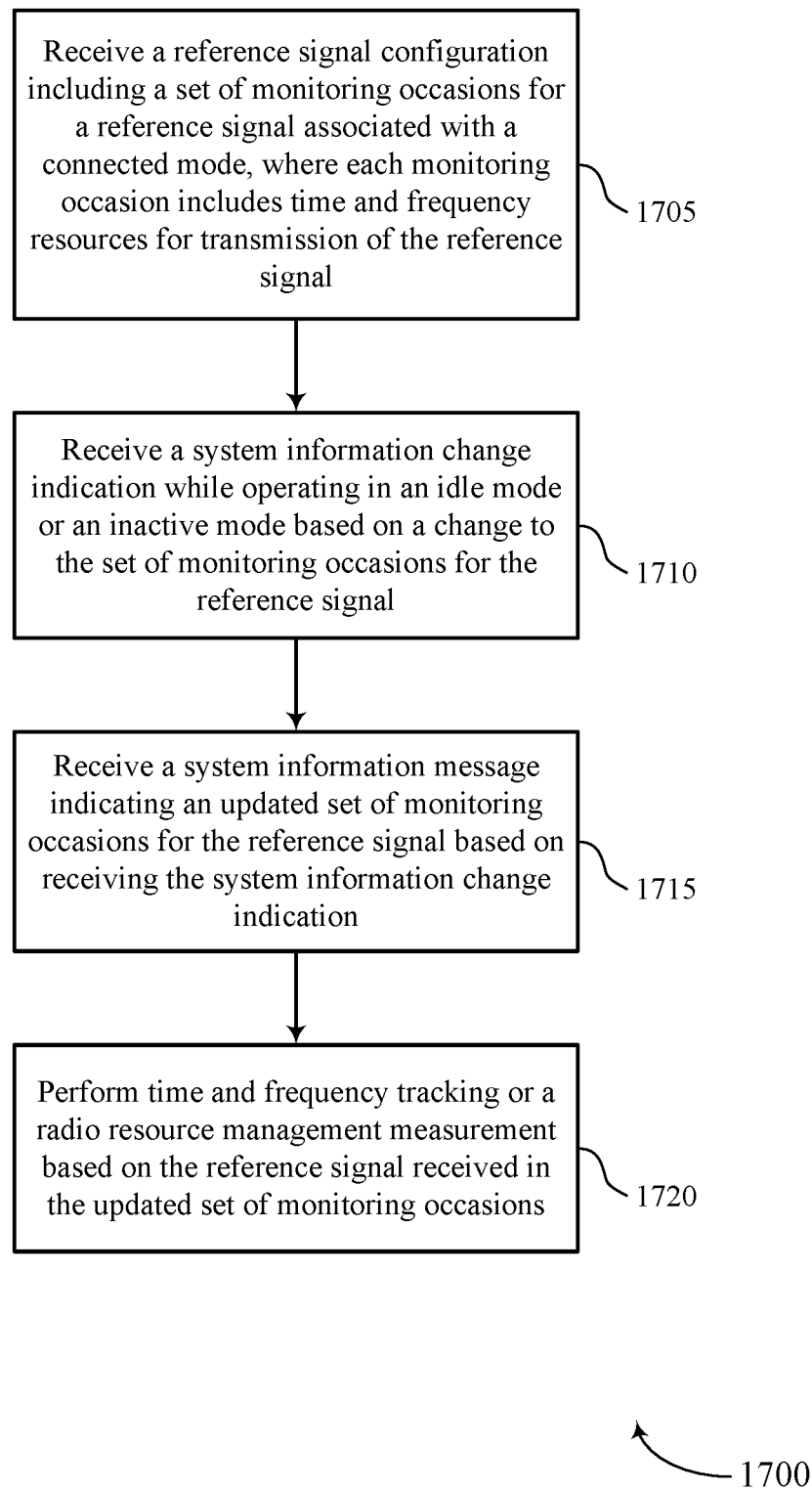

FIG. 17 shows a flowchart illustrating a method 1700 that supports reference signal monitoring occasion updates for idle and inactive UEs in accordance with aspects of the present disclosure. The operations of method 1700 may be implemented by a UE 115 or its components as described herein. For example, the operations of method 1700 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 1705, the UE may receive a reference signal configuration including a set of monitoring occasions for a reference signal associated with a connected mode, where each monitoring occasion includes time and frequency resources for transmission of the reference signal. The operations of 1705 may be performed according to the methods described herein. In some examples, aspects of the operations of 1705 may be performed by a monitoring occasion configuration component as described with reference to FIGS. 7 through 10.

At 1710, the UE may receive a system information change indication while operating in an idle mode or an inactive mode based on a change to the set of monitoring occasions for the reference signal. The operations of 1710 may be performed according to the methods described herein. In some examples, aspects of the operations of 1710 may be performed by a system information change component as described with reference to FIGS. 7 through 10.

At 1715, the UE may receive a system information message indicating an updated set of monitoring occasions for the reference signal based on receiving the system information change indication. The operations of 1715 may be performed according to the methods described herein. In some examples, aspects of the operations of 1715 may be performed by a system information message component as described with reference to FIGS. 7 through 10.

At 1720, the UE may perform time and frequency tracking or a radio resource management measurement based on the reference signal received in the updated set of monitoring occasions. The operations of 1720 may be performed according to the methods described herein. In some examples, aspects of the operations of 1720 may be performed by a resource management component as described with reference to FIGS. 7 through 10.

Figure 18:
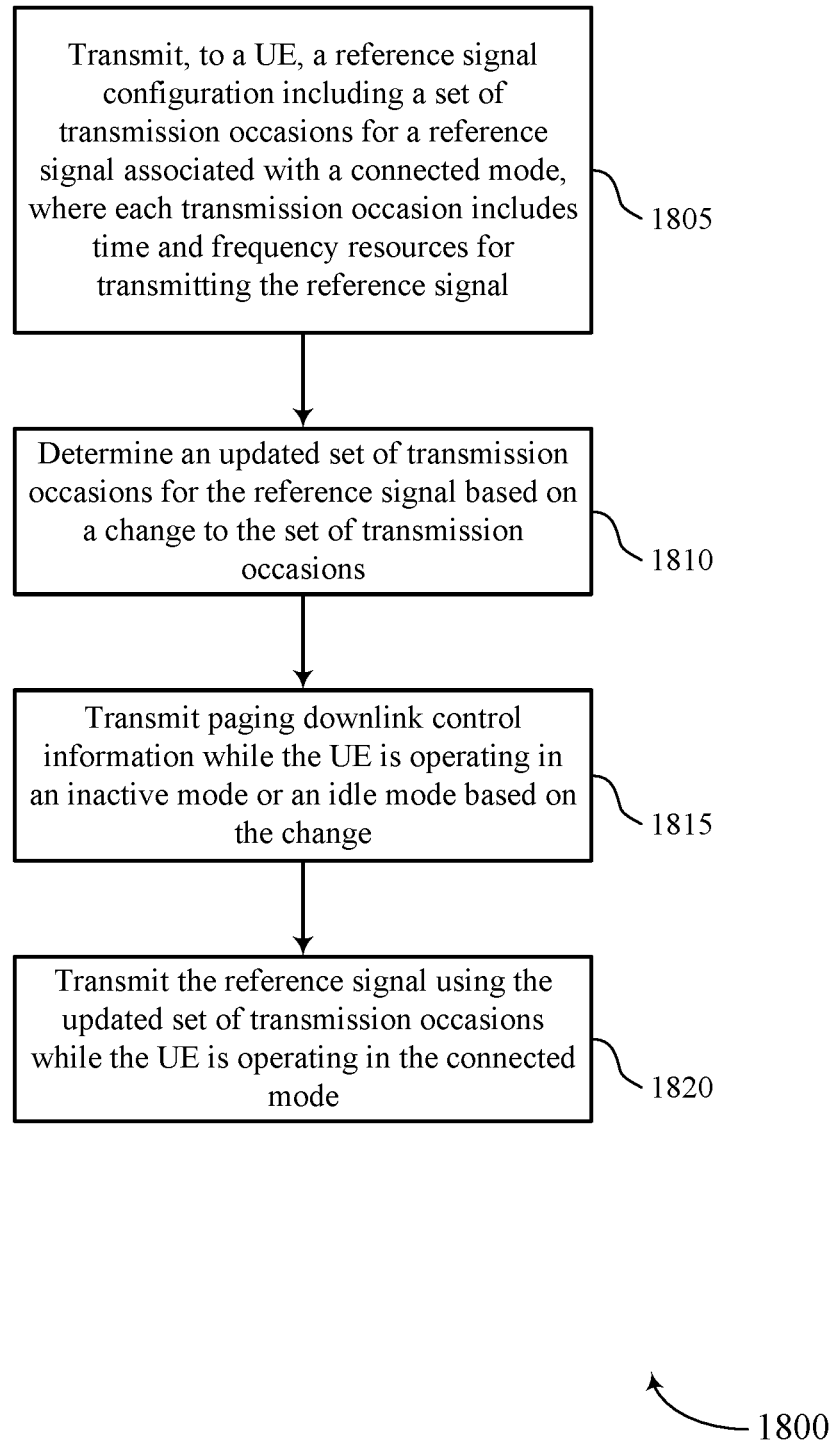

FIG. 18 shows a flowchart illustrating a method 1800 that supports reference signal monitoring occasion updates for idle and inactive UEs in accordance with aspects of the present disclosure. The operations of method 1800 may be implemented by a base station 105 or its components as described herein. For example, the operations of method 1800 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1805, the base station may transmit, to a UE, a reference signal configuration including a set of transmission occasions for a reference signal associated with a connected mode, where each transmission occasion includes time and frequency resources for transmitting the reference signal. The operations of 1805 may be performed according to the methods described herein. In some examples, aspects of the operations of 1805 may be performed by a monitoring occasion configuring component as described with reference to FIGS. 11 through 14.

At 1810, the base station may determine an updated set of transmission occasions for the reference signal based on a change to the set of transmission occasions. The operations of 1810 may be performed according to the methods described herein. In some examples, aspects of the operations of 1810 may be performed by an updated monitoring occasion component as described with reference to FIGS. 11 through 14.

At 1815, the base station may transmit paging downlink control information while the UE is operating in an inactive mode or an idle mode based on the change. The operations of 1815 may be performed according to the methods described herein. In some examples, aspects of the operations of 1815 may be performed by a paging DCI component as described with reference to FIGS. 11 through 14.

At 1820, the base station may transmit the reference signal in the updated set of transmission occasions while the UE is operating in the connected mode. The operations of 1820 may be performed according to the methods described herein. In some examples, aspects of the operations of 1820 may be performed by a reference signal transmitting component as described with reference to FIGS. 11 through 14.

Figure 19:
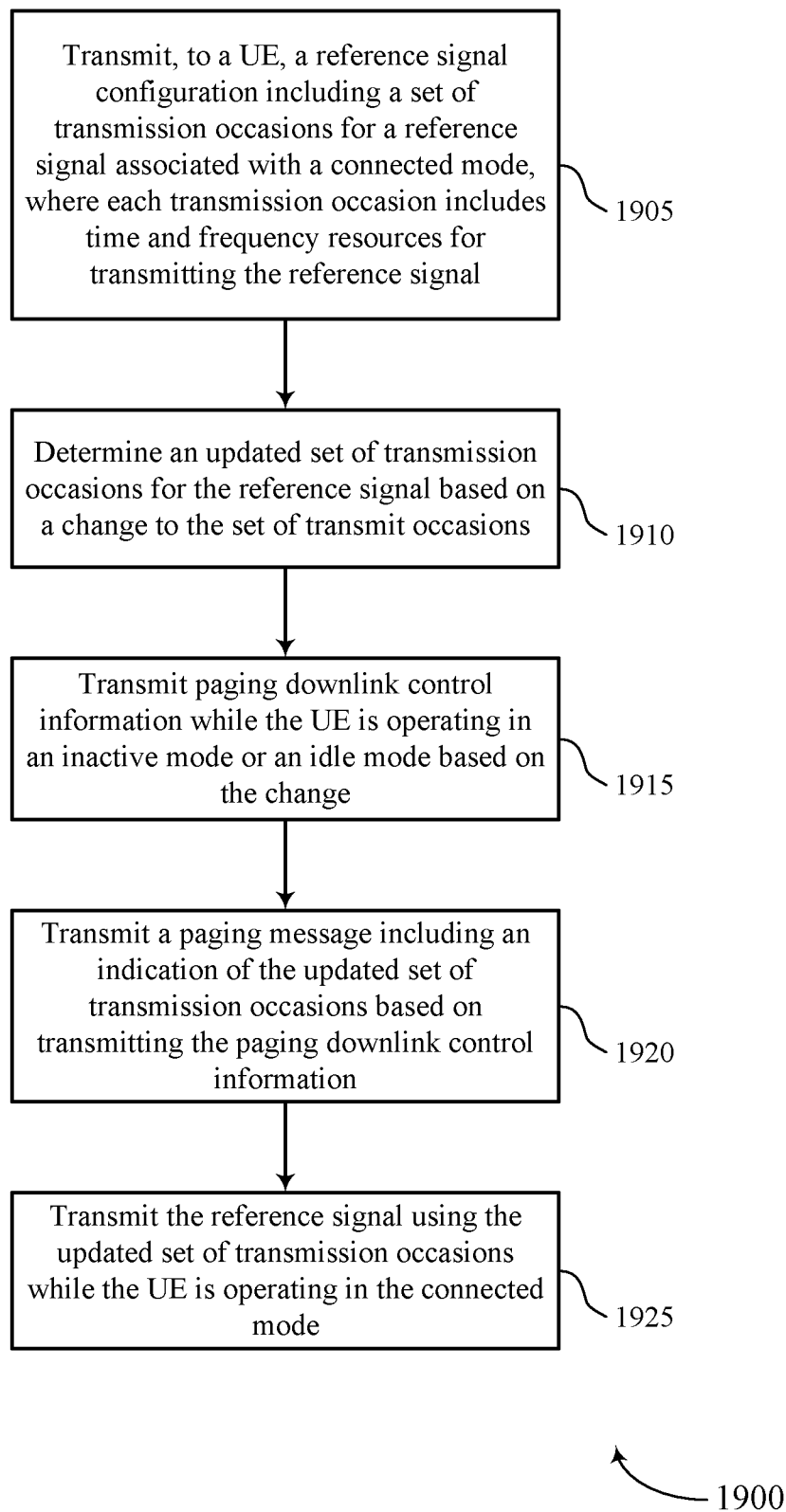

FIG. 19 shows a flowchart illustrating a method 1900 that supports reference signal monitoring occasion updates for idle and inactive UEs in accordance with aspects of the present disclosure. The operations of method 1900 may be implemented by a base station 105 or its components as described herein. For example, the operations of method 1900 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 1905, the base station may transmit, to a UE, a reference signal configuration including a set of transmission occasions for a reference signal associated with a connected mode, where each transmission occasion includes time and frequency resources for transmitting the reference signal. The operations of 1905 may be performed according to the methods described herein. In some examples, aspects of the operations of 1905 may be performed by a monitoring occasion configuring component as described with reference to FIGS. 11 through 14.

At 1910, the base station may determine an updated set of transmission occasions for the reference signal based on a change to the set of transmission occasions. The operations of 1910 may be performed according to the methods described herein. In some examples, aspects of the operations of 1910 may be performed by an updated monitoring occasion component as described with reference to FIGS. 11 through 14.

At 1915, the base station may transmit paging downlink control information while the UE is operating in an inactive mode or an idle mode based on the change. The operations of 1915 may be performed according to the methods described herein. In some examples, aspects of the operations of 1915 may be performed by a paging DCI component as described with reference to FIGS. 11 through 14.

At 1920, the base station may transmit a paging message including an indication of the updated set of transmission occasions based on transmitting the paging downlink control information. The operations of 1920 may be performed according to the methods described herein. In some examples, aspects of the operations of 1920 may be performed by a paging message component as described with reference to FIGS. 11 through 14.

At 1925, the base station may transmit the reference signal in the updated set of transmission occasions while the UE is operating in the connected mode. The operations of 1925 may be performed according to the methods described herein. In some examples, aspects of the operations of 1925 may be performed by a reference signal transmitting component as described with reference to FIGS. 11 through 14.

Figure 20:
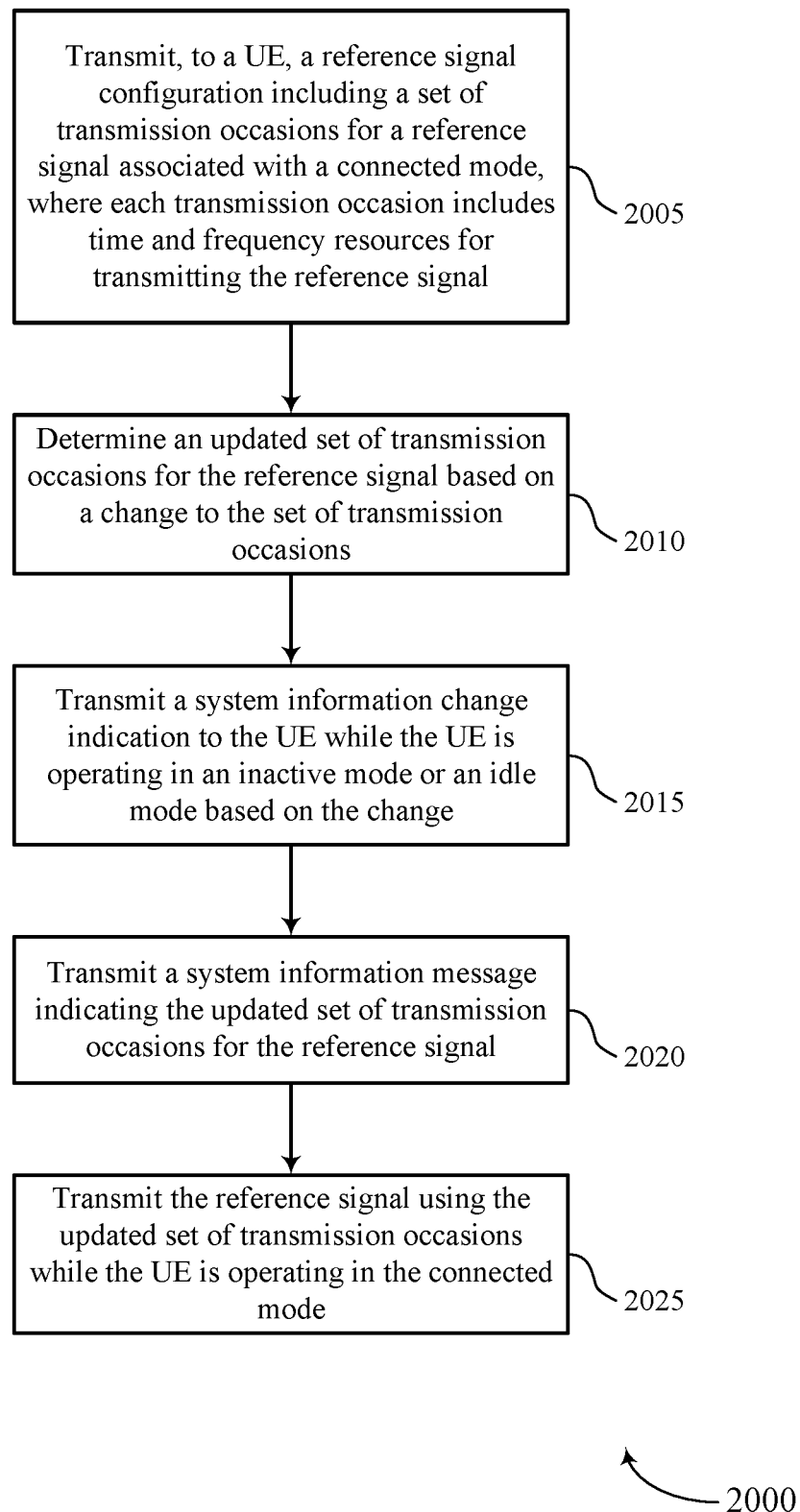

FIG. 20 shows a flowchart illustrating a method 2000 that supports reference signal monitoring occasion updates for idle and inactive UEs in accordance with aspects of the present disclosure. The operations of method 2000 may be implemented by a base station 105 or its components as described herein. For example, the operations of method 2000 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2005, the base station may transmit, to a UE, a reference signal configuration including a set of transmission occasions for a reference signal associated with a connected mode, where each transmission occasion includes time and frequency resources for transmitting the reference signal. The operations of 2005 may be performed according to the methods described herein. In some examples, aspects of the operations of 2005 may be performed by a monitoring occasion configuring component as described with reference to FIGS. 11 through 14.

At 2010, the base station may determine an updated set of transmission occasions for the reference signal based on a change to the set of transmission occasions. The operations of 2010 may be performed according to the methods described herein. In some examples, aspects of the operations of 2010 may be performed by an updated monitoring occasion component as described with reference to FIGS. 11 through 14.

At 2015, the base station may transmit a system information change indication to the UE while the UE is operating in an inactive mode or an idle mode based on the change. The operations of 2015 may be performed according to the methods described herein. In some examples, aspects of the operations of 2015 may be performed by a system information change component as described with reference to FIGS. 11 through 14.

At 2020, the base station may transmit a system information message indicating the updated set of transmission occasions for the reference signal. The operations of 2020 may be performed according to the methods described herein. In some examples, aspects of the operations of 2020 may be performed by a system information message component as described with reference to FIGS. 11 through 14.

At 2025, the base station may transmit the reference signal in the updated set of transmission occasions while the UE is operating in the connected mode. The operations of 2025 may be performed according to the methods described herein. In some examples, aspects of the operations of 2025 may be performed by a reference signal transmitting component as described with reference to FIGS. 11 through 14.

Figure 21:
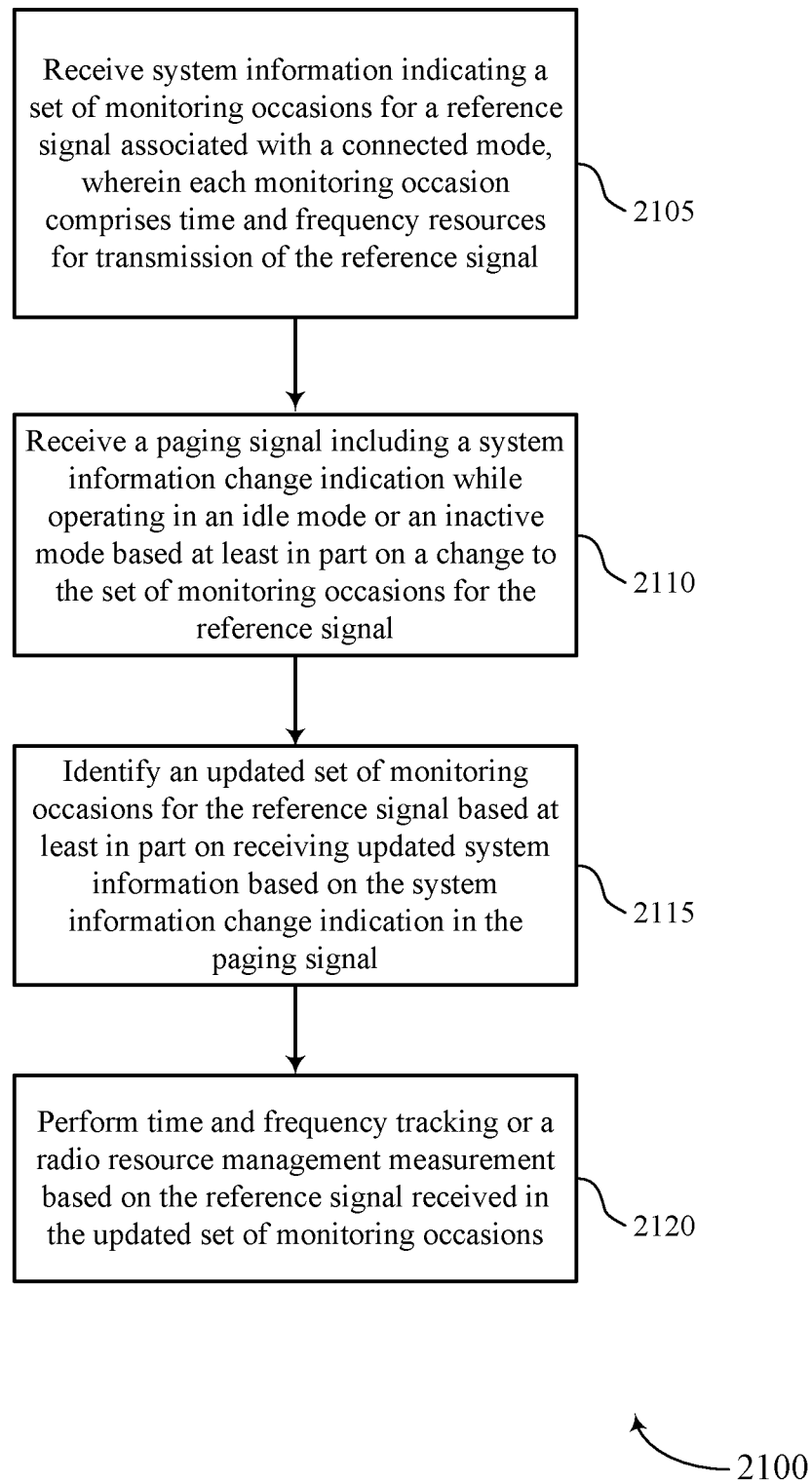

FIG. 21 shows a flowchart illustrating a method 2100 that supports reference signal monitoring occasion updates for idle and inactive UEs in accordance with aspects of the present disclosure. The operations of method 2100 may be implemented by a UE 115 or its components as described herein. For example, the operations of method 2100 may be performed by a communications manager as described with reference to FIGS. 7 through 10. In some examples, a UE may execute a set of instructions to control the functional elements of the UE to perform the functions described below. Additionally or alternatively, a UE may perform aspects of the functions described below using special-purpose hardware.

At 2105, the UE may receive system information indicating a set of monitoring occasions for a reference signal associated with a connected mode, where each monitoring occasion includes time and frequency resources for transmission of the reference signal. The operations of 2105 may be performed according to the methods described herein. In some examples, aspects of the operations of 2105 may be performed by a monitoring occasion configuration component as described with reference to FIGS. 7 through 10.

At 2110, the UE may receive a paging signal including a system information change indication while operating in an idle mode or an inactive mode based on a change to the set of monitoring occasions for the reference signal. The operations of 2110 may be performed according to the methods described herein. In some examples, aspects of the operations of 2110 may be performed by a paging DCI component as described with reference to FIGS. 7 through 10.

At 2115, the UE may identify an updated set of monitoring occasions for the reference signal based on receiving updated system information based on the system information change indication in the paging signal. In some examples, aspects of the operations of 2115 may be performed by an updated monitoring occasion component as described with reference to FIGS. 7 through 10.

At 2120, the UE may perform time and frequency tracking or a radio resource management measurement based on the reference signal received in the updated set of monitoring occasions. The operations of 2120 may be performed according to the methods described herein. In some examples, aspects of the operations of 2120 may be performed by a resource management component as described with reference to FIGS. 7 through 10.

Figure 22:
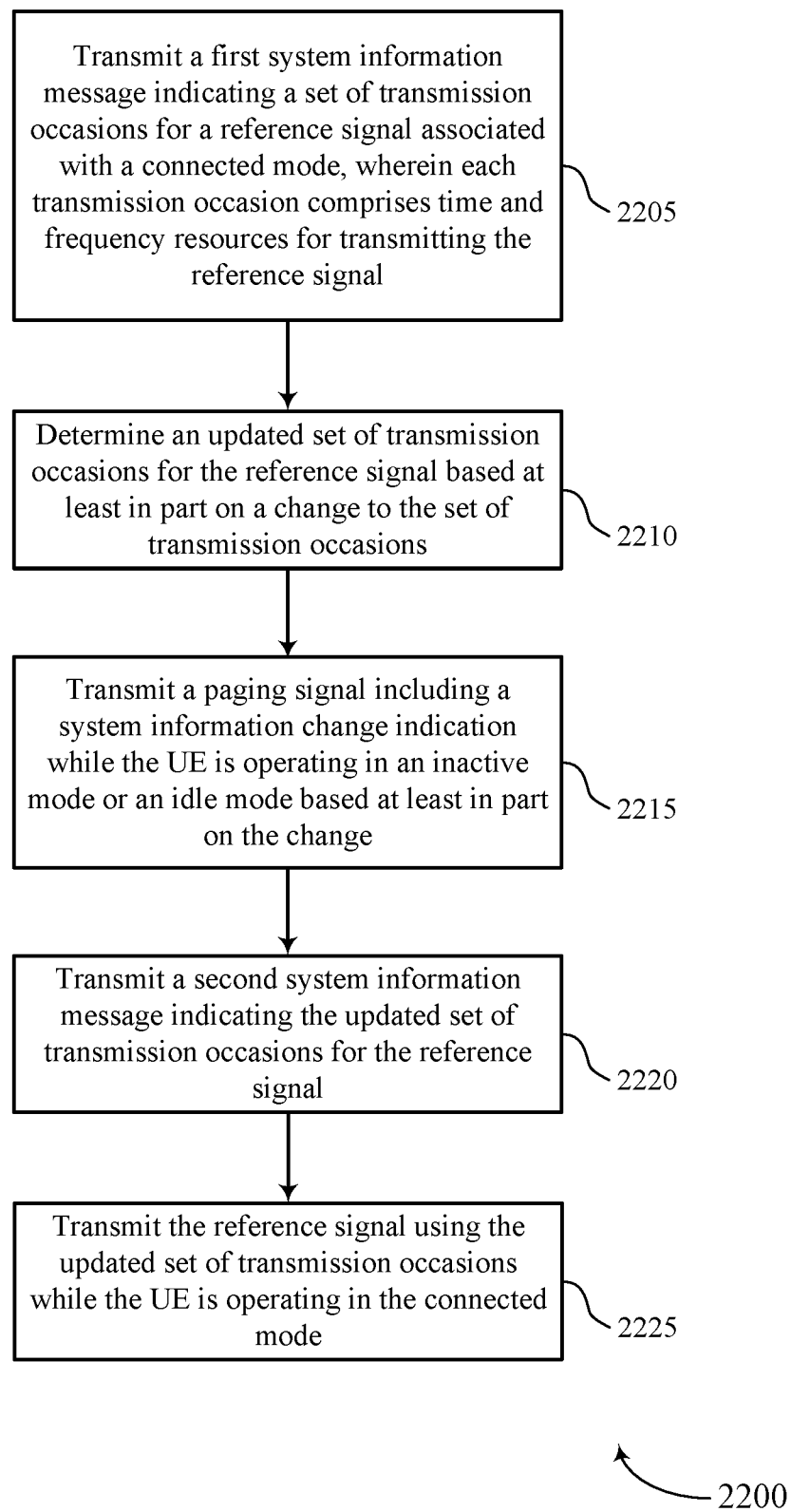

FIG. 22 shows a flowchart illustrating a method 2200 that supports reference signal monitoring occasion updates for idle and inactive UEs in accordance with aspects of the present disclosure. The operations of method 2200 may be implemented by a base station 105 or its components as described herein. For example, the operations of method 2200 may be performed by a communications manager as described with reference to FIGS. 11 through 14. In some examples, a base station may execute a set of instructions to control the functional elements of the base station to perform the functions described below. Additionally or alternatively, a base station may perform aspects of the functions described below using special-purpose hardware.

At 2205, the base station may transmit a first system information message indicating a set of transmission occasions for a reference signal associated with a connected mode, where each transmission occasion includes time and frequency resources for transmitting the reference signal. The operations of 2205 may be performed according to the methods described herein. In some examples, aspects of the operations of 2205 may be performed by a system information message component as described with reference to FIGS. 11 through 14.

At 2210, the base station may determine an updated set of transmission occasions for the reference signal based on a change to the set of transmission occasions. The operations of 2210 may be performed according to the methods described herein. In some examples, aspects of the operations of 2210 may be performed by an updated monitoring occasion component as described with reference to FIGS. 11 through 14.

At 2215, the base station may transmit a paging signal including a system information change indication while the UE is operating in an inactive mode or an idle mode based on the change. The operations of 2215 may be performed according to the methods described herein. In some examples, aspects of the operations of 2215 may be performed by a paging DCI component as described with reference to FIGS. 11 through 14.

At 2220, the base station may transmit a second system information message indicating the updated set of transmission occasions for the reference signal. The operations of 2220 may be performed according to the methods described herein. In some examples, aspects of the operations of 2220 may be performed by a system information message component as described with reference to FIGS. 11 through 14.

At 2225, the base station may transmit the reference signal in the updated set of transmission occasions while the UE is operating in the connected mode. The operations of 2225 may be performed according to the methods described herein. In some examples, aspects of the operations of 2225 may be performed by a reference signal transmitting component as described with reference to FIGS. 11 through 14.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a reference signal configuration comprising a set of monitoring occasions for a reference signal associated with a connected mode, wherein each monitoring occasion comprises time and frequency resources for transmission of the reference signal; receiving paging downlink control information while operating in an idle mode or an inactive mode based at least in part on a change to the set of monitoring occasions for the reference signal; identifying an updated set of monitoring occasions for the reference signal based at least in part on receiving the paging downlink control information; and performing time and frequency tracking or a radio resource management measurement based at least in part on the reference signal received in the updated set of monitoring occasions.

Aspect 2: The method of aspect 1, wherein the paging downlink control information comprises an indication of the updated set of monitoring occasions for the reference signal.

Aspect 3: The method of aspect 2, wherein the paging downlink control information comprises a paging identifier, a UE group identifier, or both.

Aspect 4: The method of any of aspects 2 through 3, wherein the paging downlink control information schedules a paging downlink shared channel.

Aspect 5: The method of any of aspects 1 through 4, further comprising: monitoring for a paging message comprising an indication of the updated set of monitoring occasions based at least in part on receiving the paging downlink control information.

Aspect 6: The method of aspect 5, wherein the paging downlink control information comprises a bit indicating that the paging message comprises an updated configuration for just the reference signal.

Aspect 7: The method of any of aspects 5 through 6, wherein the paging downlink control information comprises a bit indicating that the paging message comprises the indication of the updated set of monitoring occasions.

Aspect 8: The method of aspect 7, wherein the bit indicating that the paging message comprises the indication of the updated set of monitoring occasions corresponds to a reserved bit.

Aspect 9: The method of any of aspects 7 through 8, wherein the bit indicating that the paging message comprises the indication of the updated set of monitoring occasions corresponds to a repurposed bit.

Aspect 10: The method of any of aspects 5 through 9, wherein the paging downlink control information comprises a bit indicating that the paging message comprises a configuration for a tracking reference signal and not a configuration for a channel state information reference signal.

Aspect 11: The method of any of aspects 1 through 10, further comprising: applying a configuration associated with the updated set of monitoring occasions until a reception of a reconfiguration for the updated set of monitoring occasions.

Aspect 12: The method of any of aspects 1 through 11, further comprising: identifying a reference signal occasion window, wherein the UE assumes that the reference signal is transmitted by a base station at reference signal occasions within the reference signal occasion window; and monitoring for the reference signal in the updated set of monitoring occasions within the reference signal occasion window.

Aspect 13: The method of any of aspects 1 through 12, further comprising: receiving, from a base station, a deactivation message for the updated set of monitoring occasions; and refraining from monitoring for the reference signal in the updated set of monitoring occasions after receiving the deactivation message.

Aspect 14: The method of aspect 13, further comprising: monitoring for a synchronization signal block for the time and frequency tracking and radio resource management after receiving the deactivation message.

Aspect 15: The method of any of aspects 13 through 14, wherein the deactivation message is received in a reconfiguration message for the set of monitoring occasions or in downlink control information.

Aspect 16: The method of any of aspects 1 through 15, wherein a periodicity of the updated set of monitoring occasions is the same as or different from a periodicity of paging occasions for the UE.

Aspect 17: The method of any of aspects 1 through 16, further comprising: receiving the reference signal during the updated set of monitoring occasions; measuring a signal characteristic of the reference signal; and determining a radio resource management measurement condition based at least in part on the signal characteristic.

Aspect 18: The method of any of aspects 1 through 17, wherein the reference signal comprises a tracking reference signal, a channel state information reference signal, or both.

Aspect 19: A method for wireless communications at a UE, comprising: receiving a reference signal configuration comprising a set of monitoring occasions for a reference signal associated with a connected mode, wherein each monitoring occasion comprises time and frequency resources for transmission of the reference signal; receiving a system information change indication while operating in an idle mode or an inactive mode based at least in part on a change to the set of monitoring occasions for the reference signal; receiving a system information message indicating an updated set of monitoring occasions for the reference signal based at least in part on receiving the system information change indication; and performing time and frequency tracking or a radio resource management measurement based at least in part on the reference signal received in the updated set of monitoring occasions.

Aspect 20: The method of aspect 19, further comprising: applying a configuration associated with the updated set of monitoring occasions until a reception of a reconfiguration for the updated set of monitoring occasions.

Aspect 21: The method of any of aspects 19 through 20, wherein monitoring for the reference signal further comprises: identifying a reference signal occasion window, wherein the UE assumes that the reference signal is transmitted by a base station at reference signal occasions within the reference signal occasion window; and monitoring for the reference signal in the updated set of monitoring occasions within the reference signal occasion window.

Aspect 22: The method of any of aspects 19 through 21, further comprising: receiving, from a base station, a deactivation message for the updated set of monitoring occasions; and refraining from monitoring for the reference signal in the updated set of monitoring occasions after receiving the deactivation message.

Aspect 23: The method of aspect 22, further comprising: monitoring for a synchronization signal block for the time and frequency tracking and radio resource management after receiving the deactivation message.

Aspect 24: The method of any of aspects 22 through 23, wherein the deactivation message is received in a reconfiguration message for the set of monitoring occasions or in downlink control information.

Aspect 25: The method of any of aspects 19 through 24, wherein a periodicity of the updated set of monitoring occasions is the same as or different from a periodicity of paging occasions for the UE.

Aspect 26: The method of any of aspects 19 through 25, further comprising: receiving the reference signal during the updated set of monitoring occasions; measuring a signal characteristic of the reference signal; and determining a radio resource management measurement condition based at least in part on the signal characteristic.

Aspect 27: The method of any of aspects 19 through 26, wherein the reference signal comprises a tracking reference signal, a channel state information reference signal, or both.

Aspect 28: A method for wireless communications at a base station, comprising: transmitting, to a UE, a reference signal configuration comprising a set of transmission occasions for a reference signal associated with a connected mode, wherein each transmission occasion comprises time and frequency resources for transmitting the reference signal; determining an updated set of transmission occasions for the reference signal based at least in part on a change to the set of transmission occasions; transmitting paging downlink control information while the UE is operating in an inactive mode or an idle mode based at least in part on the change; and transmitting the reference signal in the updated set of transmission occasions while the UE is operating in the connected mode.

Aspect 29: The method of aspect 28, wherein the paging downlink control information comprises an indication of the updated set of transmission occasions for the reference signal.

Aspect 30: The method of aspect 29, wherein the paging downlink control information comprises a paging identifier, a UE group identifier, or both.

Aspect 31: The method of any of aspects 29 through 30, wherein the paging downlink control information schedules a paging downlink shared channel.

Aspect 32: The method of any of aspects 28 through 31, further comprising: transmitting a paging message comprising an indication of the updated set of transmission occasions based at least in part on transmitting the paging downlink control information.

Aspect 33: The method of aspect 32, wherein the paging downlink control information comprises a bit indicating that a configuration comprises an updated configuration for just the reference signal.

Aspect 34: A method for wireless communications at a UE, comprising: receiving system information indicating a set of monitoring occasions for a reference signal associated with a connected mode, wherein each monitoring occasion comprises time and frequency resources for transmission of the reference signal; receiving a paging signal including a system information change indication while operating in an idle mode or an inactive mode based at least in part on a change to the set of monitoring occasions for the reference signal; identifying an updated set of monitoring occasions for the reference signal based at least in part on receiving updated system information based on the system information change indication in the paging signal; and performing time and frequency tracking or a radio resource management measurement based at least in part on the reference signal received in the updated set of monitoring occasions.

Aspect 35: The method of aspect 34, wherein the paging signal comprises an indication of the updated set of monitoring occasions for the reference signal.

Aspect 36: The method of aspect 35, wherein the paging signal comprises a paging identifier, a UE group identifier, or both.

Aspect 37: The method of any of aspects 35 through 36, wherein the paging signal schedules a paging downlink shared channel.

Aspect 38: The method of any of aspects 34 through 37, further comprising: monitoring for a paging message comprising an indication of the updated set of monitoring occasions based at least in part on receiving the paging signal.

Aspect 39: The method of aspect 38, wherein the paging signal comprises a bit indicating that the paging message comprises an updated configuration for just the reference signal.

Aspect 40: The method of any of aspects 38 through 39, wherein the paging signal comprises a bit indicating that the paging message comprises the indication of the updated set of monitoring occasions.

Aspect 41: The method of aspect 40, wherein the bit indicating that the paging message comprises the indication of the updated set of monitoring occasions corresponds to a reserved bit.

Aspect 42: The method of any of aspects 40 through 41, wherein the bit indicating that the paging message comprises the indication of the updated set of monitoring occasions corresponds to a repurposed bit.

Aspect 43: The method of any of aspects 38 through 42, wherein the paging signal comprises a bit indicating that the paging message comprises a configuration for a tracking reference signal and not a configuration for a channel state information reference signal.

Aspect 44: The method of any of aspects 34 through 43, further comprising: applying a configuration associated with the updated set of monitoring occasions until a reception of a reconfiguration for the updated set of monitoring occasions.

Aspect 45: The method of any of aspects 34 through 44, further comprising: identifying a reference signal occasion window, wherein the UE assumes that the reference signal is transmitted by a base station at reference signal occasions within the reference signal occasion window; and monitoring for the reference signal in the updated set of monitoring occasions within the reference signal occasion window.

Aspect 46: The method of any of aspects 34 through 45, further comprising: receiving, from a base station, a deactivation message for the updated set of monitoring occasions; and refraining from monitoring for the reference signal in the updated set of monitoring occasions after receiving the deactivation message.

Aspect 47: The method of aspect 46, further comprising: monitoring for a synchronization signal block for the time and frequency tracking and radio resource management after receiving the deactivation message.

Aspect 48: The method of any of aspects 46 through 47, wherein the deactivation message is received in a reconfiguration message for the set of monitoring occasions or in downlink control information.

Aspect 49: The method of any of aspects 34 through 48, wherein a periodicity of the updated set of monitoring occasions is the same as or different from a periodicity of paging occasions for the UE.

Aspect 50: The method of any of aspects 34 through 49, further comprising: receiving the reference signal during the updated set of monitoring occasions; measuring a signal characteristic of the reference signal; and determining a radio resource management measurement condition based at least in part on the signal characteristic.

Aspect 51: The method of any of aspects 34 through 50, wherein the reference signal comprises a tracking reference signal, a channel state information reference signal, or both.

Aspect 52: The method of any of aspects 34 through 51, further comprising: receiving, from a base station, a deactivation message for the updated set of monitoring occasions; and refraining from monitoring for the reference signal in the updated set of monitoring occasions after receiving the deactivation message.

Aspect 53: A method for wireless communications at a base station, comprising: transmitting a first system information message indicating a set of transmission occasions for a reference signal associated with a connected mode, wherein each transmission occasion comprises time and frequency resources for transmitting the reference signal; determining an updated set of transmission occasions for the reference signal based at least in part on a change to the set of transmission occasions; transmitting, to a UE, a paging signal including a system information change indication while the UE is operating in an inactive mode or an idle mode based at least in part on the change; transmitting a second system information message indicating the updated set of transmission occasions for the reference signal; and transmitting the reference signal in the updated set of transmission occasions while the UE is operating in the connected mode.

Aspect 54: The method of aspect 53, wherein the paging signal comprises an indication of the updated set of transmission occasions for the reference signal.

Aspect 55: The method of any of aspects 53 through 54, further comprising: transmitting a paging message comprising an indication of the updated set of transmission occasions based at least in part on transmitting the paging signal.

Aspect 56: The method of aspect 55, wherein the paging signal comprises a bit indicating that a configuration comprises an updated configuration for just the reference signal.

Aspect 57: The method of any of aspects 55 through 56, wherein the paging signal comprises a bit indicating that the paging message comprises the indication of the updated set of transmission occasions.

Aspect 58: The method of aspect 57, wherein the bit indicating that the paging message comprises the indication of the updated set of transmission occasions corresponds to a reserved bit.

Aspect 59: The method of any of aspects 57 through 58, wherein the bit indicating that the paging message comprises the indication of the updated set of transmission occasions corresponds to a repurposed bit.

Aspect 60: The method of any of aspects 55 through 59, wherein the paging signal comprises a bit indicating that the paging message comprises a configuration for a tracking reference signal and not a configuration for a channel state information reference signal.

Aspect 61: The method of any of aspects 53 through 60, further comprising: transmitting a deactivation message to the UE for the updated set of transmission occasions.

Aspect 62: An apparatus for wireless communications at a UE, comprising a processor; memory coupled with the processor; and instructions stored in the memory and executable by the processor to cause the apparatus to perform a method of any of aspects 1 through 18.

Aspect 63: An apparatus for wireless communications at a UE, comprising at least one means for performing a method of any of aspects 1 through 18.

Aspect 64: A non-transitory computer-readable medium storing code for wireless communications at a UE, the code comprising instructions executable by a processor to perform a method of any of aspects 1 through 18.

Aspect 65: An apparatus for wireless communications at a UE, comprising a processor; memory coupled with the processor; and instructions stored in the memory and executable by the processor to cause the apparatus to perform a method of any of aspects 19 through 27.

Aspect 66: An apparatus for wireless communications at a UE, comprising at least one means for performing a method of any of aspects 19 through 27.

Aspect 67: A non-transitory computer-readable medium storing code for wireless communications at a UE, the code comprising instructions executable by a processor to perform a method of any of aspects 19 through 27.

Aspect 68: An apparatus for wireless communications at a base station, comprising a processor; memory coupled with the processor; and instructions stored in the memory and executable by the processor to cause the apparatus to perform a method of any of aspects 28 through 33.

Aspect 69: An apparatus for wireless communications at a base station, comprising at least one means for performing a method of any of aspects 28 through 33.

Aspect 70: A non-transitory computer-readable medium storing code for wireless communications at a base station, the code comprising instructions executable by a processor to perform a method of any of aspects 28 through 33.

Aspect 71: An apparatus for wireless communications at a UE, comprising a processor; memory coupled with the processor; and instructions stored in the memory and executable by the processor to cause the apparatus to perform a method of any of aspects 34 through 52.

Aspect 72: An apparatus for wireless communications at a UE, comprising at least one means for performing a method of any of aspects 34 through 52.

Aspect 73: A non-transitory computer-readable medium storing code for wireless communications at a UE, the code comprising instructions executable by a processor to perform a method of any of aspects 34 through 52.

Aspect 74: An apparatus for wireless communications at a base station, comprising a processor; memory coupled with the processor; and instructions stored in the memory and executable by the processor to cause the apparatus to perform a method of any of aspects 53 through 61.

Aspect 75: An apparatus for wireless communications at a base station, comprising at least one means for performing a method of any of aspects 53 through 61.

Aspect 76: A non-transitory computer-readable medium storing code for wireless communications at a base station, the code comprising instructions executable by a processor to perform a method of any of aspects 53 through 61.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, or any combination thereof. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on." As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving system information indicating a set of monitoring occasions for a tracking reference signal associated with a connected mode, wherein each monitoring occasion comprises time and frequency resources for transmission of the tracking reference signal;
    receiving a paging signal including a system information change indication while operating in an idle mode or an inactive mode based at least in part on a change to the set of monitoring occasions for the tracking reference signal, wherein the paging signal includes one or more bits indicating that a paging message comprises an indication of an updated set of monitoring occasions for the tracking reference signal;
    receiving the paging message comprising the indication of the updated set of monitoring occasions for the tracking reference signal based at least in part on the system information change indication in the paging signal and the one or more bits indicating that the paging message comprises the indication of the updated set of monitoring occasions; and
    performing time and frequency tracking or a radio resource management measurement based at least in part on the tracking reference signal received in the updated set of monitoring occasions.

2. The method of claim 1, wherein the paging signal comprises an indication of the updated set of monitoring occasions for the tracking reference signal.

3. The method of claim 2, wherein the paging signal comprises a paging identifier, a UE group identifier, or both.

4. The method of claim 2, wherein the paging signal schedules a paging downlink shared channel.

5. The method of claim 1, wherein the one or more bits indicate that the paging message comprises an updated configuration for just the tracking reference signal.

6. The method of claim 1, wherein the one or more bits indicating that the paging message comprises the indication of the updated set of monitoring occasions corresponds to one or more reserved bits.

7. The method of claim 1, wherein the one or more bits indicating that the paging message comprises the indication of the updated set of monitoring occasions corresponds to one or more repurposed bits.

8. The method of claim 1, wherein the one or more bits indicate that the paging message comprises a configuration for the tracking reference signal and not a configuration for a channel state information reference signal.

9. The method of claim 1, further comprising:
    applying a configuration associated with the updated set of monitoring occasions until a reception of a reconfiguration for the updated set of monitoring occasions.

10. The method of claim 1, further comprising:
    identifying a reference signal occasion window, wherein the UE assumes that the tracking reference signal is transmitted by a network device at reference signal occasions within the reference signal occasion window; and monitoring for the tracking reference signal in the updated set of monitoring occasions within the reference signal occasion window.

11. The method of claim 1, further comprising:
receiving, from a network device, a deactivation message for the updated set of monitoring occasions; and
refraining from monitoring for the tracking reference signal in the updated set of monitoring occasions after receiving the deactivation message.

12. The method of claim 11, further comprising:
monitoring for a synchronization signal block for the time and frequency tracking or the radio resource management measurement after receiving the deactivation message.

13. The method of claim 11, wherein the deactivation message is received in a reconfiguration message for the set of monitoring occasions or in downlink control information.

14. The method of claim 1, wherein a periodicity of the updated set of monitoring occasions is the same as or different from a periodicity of paging occasions for the UE.

15. The method of claim 1, further comprising:
receiving the tracking reference signal during the updated set of monitoring occasions;
measuring a signal characteristic of the tracking reference signal; and
determining a radio resource management measurement condition based at least in part on the signal characteristic.

16. The method of claim 1, wherein the set of monitoring occasions are associated with a channel state information reference signal.

17. The method of claim 1, further comprising:
receiving, from a network device, a deactivation message for the updated set of monitoring occasions; and
refraining from monitoring for the tracking reference signal in the updated set of monitoring occasions after receiving the deactivation message.

18. A method for wireless communications at a network device, comprising:
transmitting a first system information message indicating a set of transmission occasions for a tracking reference signal associated with a connected mode, wherein each transmission occasion comprises time and frequency resources for transmitting the tracking reference signal;
transmitting, to a user equipment (UE) operating in an inactive mode or an idle mode, a paging signal including a system information change indication based at least in part on a change to the set of transmission occasions, wherein the paging signal includes one or more bits indicating that a paging message comprises an indication of an updated set of transmission occasions for the tracking reference signal;
transmitting the paging message comprising the indication of the updated set of transmission occasions for the tracking reference signal based at least in part on the system information change indication in the paging signal and the one or more bits indicating the paging message comprises the indication of the updated set of transmission occasions; and
transmitting the tracking reference signal in the updated set of transmission occasions while the UE is operating in the connected mode.

19. The method of claim 18, wherein the paging signal comprises an indication of the updated set of transmission occasions for the tracking reference signal.

20. The method of claim 18, wherein the one or more bits indicate that a configuration comprises an updated configuration for just the tracking reference signal.

21. The method of claim 18, wherein the one or more bits indicating that the paging message comprises the indication of the updated set of transmission occasions corresponds to one or more reserved bits.

22. The method of claim 18, wherein the one or more bits indicating that the paging message comprises the indication of the updated set of transmission occasions corresponds to one or more repurposed bits.

23. The method of claim 18, wherein one or more bits indicate that the paging message comprises a configuration for the tracking reference signal and not a configuration for a channel state information reference signal.

24. The method of claim 18, further comprising:
transmitting a deactivation message to the UE for the updated set of transmission occasions.

25. An apparatus for wireless communications at a user equipment (UE), comprising:
at least one processor; and
at least one memory coupled with the at least one processor and storing instructions executable by the at least one processor to cause the UE to:
receive system information indicating a set of monitoring occasions for a tracking reference signal associated with a connected mode, wherein each monitoring occasion comprises time and frequency resources for transmission of the tracking reference signal;
receive a paging signal including a system information change indication while operating in an idle mode or an inactive mode based at least in part on a change to the set of monitoring occasions for the tracking reference signal, wherein the paging signal includes one or more bits indicating that a paging message comprises an indication of an updated set of monitoring occasions for the tracking reference signal;
receive the paging message comprising the indication of the updated set of monitoring occasions for the tracking reference signal based at least in on the system information change indication in the paging signal and the one or more bits indicating that the paging message comprises the indication of the updated set of monitoring occasions; and
perform time and frequency tracking or a radio resource management measurement based at least in part on the tracking reference signal received in the updated set of monitoring occasions.

26. An apparatus for wireless communications at a network device, comprising:
at least one processor; and
at least one memory coupled with the at least one processor and storing instructions executable by the at least one processor to cause the network device to:
transmit a first system information message indicating a set of transmission occasions for a tracking reference signal associated with a connected mode, wherein each transmission occasion comprises time and frequency resources for transmitting the tracking reference signal;
transmit, to a user equipment (UE) operating in an inactive mode or an idle mode, a paging signal including a system information change indication to the UE based at least in part on a change to the set of transmission occasions, wherein the paging signal includes one or more bits indicating that a paging message comprises an indication of an updated set of transmission occasions for the tracking reference signal;

transmit the paging message comprising the indication of the updated set of transmission occasions for the tracking reference signal based at least in part on the system information change indication in the paging signal and the one or more bits indicating that the paging message comprises the indication of the updated set of transmission occasions; and transmit the tracking reference signal in the updated set of transmission occasions while the UE is operating in the connected mode.

27. The apparatus of claim 25, wherein the paging signal comprises an indication of the updated set of monitoring occasions for the tracking reference signal.

28. The apparatus of claim 27, wherein the paging signal comprises a paging identifier, a UE group identifier, or both.

29. The apparatus of claim 27, wherein the paging signal schedules a paging downlink shared channel.

30. The apparatus of claim 25, wherein the paging signal comprises one or more bits indicating that the paging message comprises an updated configuration for just the tracking reference signal.

\* \* \* \* \*